(12) United States Patent
Shintani et al.

(10) Patent No.: US 8,309,269 B2
(45) Date of Patent: Nov. 13, 2012

(54) FUEL CELL, MEMBRANE-ELECTRODE ASSEMBLY, AND MEMBRANE-CATALYST LAYER ASSEMBLY

(75) Inventors: Haruhiko Shintani, Osaka (JP); Atsushi Nogi, Aichi (JP); Miho Gemba, Osaka (JP); Takashi Nakagawa, Osaka (JP); Yoichiro Tsuji, Osaka (JP)

(73) Assignee: Panasonic Corporation, Osaka (JP)

( * ) Notice: Subject to any disclaimer, the term of this patent is extended or adjusted under 35 U.S.C. 154(b) by 508 days.

(21) Appl. No.: 12/667,028

(22) PCT Filed: Jun. 25, 2008

(86) PCT No.: PCT/JP2008/001659
§ 371 (c)(1),
(2), (4) Date: Dec. 28, 2009

(87) PCT Pub. No.: WO2009/001560
PCT Pub. Date: Dec. 31, 2008

(65) Prior Publication Data
US 2010/0209807 A1 Aug. 19, 2010

(30) Foreign Application Priority Data
Jun. 25, 2007 (JP) .................... 2007-165769

(51) Int. Cl.
*H01M 8/10* (2006.01)

(52) U.S. Cl. ........ 429/486; 429/485; 429/484; 429/483; 429/480

(58) Field of Classification Search .................. 429/486, 429/485, 484, 483, 480
See application file for complete search history.

(56) References Cited

U.S. PATENT DOCUMENTS

| | | | |
|---|---|---|---|
| 6,855,452 B1 | 2/2005 | Cooper et al. | |
| 2004/0197627 A1 | 10/2004 | Yan et al. | |
| 2005/0147867 A1 | 7/2005 | Cooper et al. | |
| 2006/0019140 A1 | 1/2006 | Kawazoe et al. | |
| 2007/0104994 A1 | 5/2007 | Endoh et al. | |
| 2007/0111076 A1 | 5/2007 | Endoh | |

FOREIGN PATENT DOCUMENTS

| | | |
|---|---|---|
| JP | 11-265721 | 9/1999 |
| JP | 2002-532833 | 10/2002 |
| JP | 3375200 | 2/2003 |
| JP | 2003-086192 | 3/2003 |
| JP | 2003-288915 | 10/2003 |
| JP | 2006-210334 | 8/2006 |
| JP | 2006-244782 | 9/2006 |
| JP | 2006-522433 | 9/2006 |
| JP | 2006-294594 | 10/2006 |
| JP | 2006-338941 | 12/2006 |
| JP | 2007-031718 | 2/2007 |
| JP | 2008-091102 | 4/2008 |
| JP | 2008-123728 | 5/2008 |

*Primary Examiner* — Helen O Conley

(74) *Attorney, Agent, or Firm* — McDermott Will & Emery LLP

(57) ABSTRACT

A fuel cell of the present invention includes a membrane-electrode assembly (10), an anode separator (20), and a cathode separator (30). The membrane-electrode assembly (10) includes: a polymer electrolyte membrane (1); a first anode catalyst layer (2A) and an anode gas diffusion layer (4) sequentially stacked on one of main surfaces of the polymer electrolyte membrane (1); a second anode catalyst layer (2B) disposed between the polymer electrolyte membrane (1) and the first anode catalyst layer (2A); and a cathode catalyst layer (3) and a cathode gas diffusion layer (5) sequentially stacked on the other main surface of the polymer electrolyte membrane (1). The second anode catalyst layer (2B) contains a catalyst which adsorbs a sulfur compound.

8 Claims, 17 Drawing Sheets

(a)

(b)

FUEL CELL, MEMBRANE-ELECTRODE ASSEMBLY, AND MEMBRANE-CATALYST LAYER ASSEMBLY

RELATED APPLICATIONS

This application is the U.S. National Phase under 35 U.S.C. §371 of International Application No. PCT/JP2008/001659, filed on Jun. 25, 2008, which in turn claims the benefit of Japanese Application No. 2007-165769, filed on Jun. 25, 2007, the disclosures of which Applications are incorporated by reference herein.

TECHNICAL FIELD

The present invention relates to a polymer electrolyte fuel cell including a polymer electrolyte membrane and also relates to a membrane-electrode assembly and a membrane-catalyst layer assembly which are used in the polymer electrolyte fuel cell.

BACKGROUND ART

In recent years, a fuel cell is attracting attention as a clean energy source. Examples of the fuel cell are a molten carbonate fuel cell, an alkali aqueous solution fuel cell, a phosphoric acid fuel cell, and a polymer electrolyte fuel cell. Since an operating temperature of each of the phosphoric acid fuel cell and the polymer electrolyte fuel cell is lower than that of each of the other fuel cells, each of the phosphoric acid fuel cell and the polymer electrolyte fuel cell is often used as the fuel cell constituting a fuel cell system. Especially, since the operating temperature of the polymer electrolyte fuel cell is low, the polymer electrolyte fuel cell is preferable as the fuel cell of a domestic fuel cell system, such as a cogeneration system.

The polymer electrolyte fuel cell is configured by stacking and fastening a plurality of cells, each including: a membrane-electrode assembly constituted by an anode, a cathode, and a polymer electrolyte membrane; an anode separator; and a cathode separator. The anode is constituted by an anode catalyst layer and an anode gas diffusion layer. The cathode is constituted by a cathode catalyst layer and a cathode gas diffusion layer. The polymer electrolyte fuel cell generates electricity and heat by a cell reaction between a fuel gas supplied to the anode and an oxidizing gas supplied to the cathode.

It is known that in this case, in order to suppress the deterioration of the polymer electrolyte membrane to extend the life of the fuel cell, the fuel cell is operated by being supplied with a reactant gas having a dew point that is equal to a temperature of the cell (full humidification operation) (see Patent Document 1).

The anode catalyst layer of the polymer electrolyte fuel cell may deteriorate by being poisoned by carbon monoxide slightly contained in the supplied fuel gas. Here, proposed is that the anode catalyst layer is formed to include two layers, and a CO-resistant catalyst is used as a catalyst of one of the two layers (see Patent Document 2). With this configuration, the poisoning of the anode is suppressed even if carbon monoxide remains in the fuel gas supplied to the anode.

Moreover, known is a fuel cell in which in order to suppress the deterioration of the electrolyte membrane by hydrogen peroxide, a material having a hydrogen peroxide decomposing ability is included in at least one of the electrolyte membrane, the anode, and a portion between the electrolyte membrane and the anode (see Patent Document 3 for example).

Moreover, known is a polymer electrolyte membrane-electrode assembly in which a second catalyst layer formed by a catalyst, an electrically conductive carrier, and an ionomer is disposed between a relatively dry region in a planar direction of the MEA and the polymer electrolyte (see Patent Document 4 for example). In accordance with the polymer electrolyte membrane-electrode assembly, the generation of hydrogen peroxide by cross leakage is suppressed, and the decomposition and deterioration of the electrolyte membrane by hydrogen peroxide can be therefore effectively suppressed.

Moreover, known is a membrane-electrode assembly which is for use in a solid polymer electrolyte fuel cell and in which in order to improve a water retention property, a layer making a contact angle of 10 degrees or less with water and containing an inorganic compound is disposed between the polymer electrolyte and the catalyst layer of at least one of the cathode and the anode (see Patent Document 5).

Moreover, known is a fuel cell in which in order to suppress a crossover of hydrogen and methanol, a thin layer formed by a catalyst, an oxide, and a polymer electrolyte is disposed on an interface between the cathode and the polymer electrolyte (see Patent Document 6 for example).

Moreover, known is a solid polymer electrolyte composition in which in order to improve the water retention property and suppress the cross leakage of hydrogen, fine particles of precious metal and metal oxide are dispersed in the polymer electrolyte (see Patent Document 7 for example).

Patent Document 1: Japanese Laid-Open Patent Application Publication No. 2006-210334
Patent Document 2: Published Japanese Translation of PCT Application No. 2002-532833
Patent Document 3: Japanese Laid-Open Patent Application Publication No. 2006-244782
Patent Document 4: Japanese Laid-Open Patent Application Publication No. 2006-338941
Patent Document 5: Japanese Laid-Open Patent Application Publication No. 2003-288915
Patent Document 6: Japanese Laid-Open Patent Application Publication No. 2003-086192
Patent Document 7: Japanese Patent No. 3375200

DISCLOSURE OF THE INVENTION

Problems to be Solved by the Invention

In order to put a domestic fuel cell system, such as a cogeneration system, to practical use, reductions in cost and size of the fuel cell has been pursued. It has been conventionally thought that in order to cause the fuel cell to stably generate electric power, the reactant gas needs to be humidified under a high humidification condition. However, this has become unnecessary by, for example, progress of materials. Here, in order to realize cost reduction for example, the present inventors have studied not to provide a humidifying device or to humidify the reactant gas under a low humidification condition.

As a result, the present inventors have found the fact that in accordance with the configuration of Patent Document 1, in a case where the fuel cell is operated under the low humidification condition, the poisoning of the anode proceeds by influences of impurities from the cathode and is therefore not suppressed adequately, and this destabilizes the operation of the fuel cell. Moreover, in accordance with the configuration specifically described in Patent Document 2, since the CO-resistant catalyst is used in an upper layer (layer closer to an anode gas channel), the poisoning of the catalyst by CO contained in an anode gas can be prevented, but the poisoning by impurities from a cathode gas cannot be prevented. Moreover, Patent Documents 3 to 7 do not describe the poisoning of the anode by the impurities from the cathode.

The present invention was made to solve the above problems, and an object of the present invention is to provide a fuel cell configured to stably operate even if operated under the low humidification condition, and a membrane-electrode assembly and membrane-catalyst layer assembly which constitute the fuel cell.

Means for Solving the Problems

As a result of diligent studies, the present inventors have obtained the following findings.

Normally, air is used as the oxidizing gas supplied to a cathode gas channel of the fuel cell. The air slightly contains a sulfur compound derived from, for example, an exhaust gas of a vehicle. The present inventors have found that in a case where the fuel cell is operated under the low humidification condition, back diffusion water moves from the cathode side to the anode side, and the sulfur compound contained in the oxidizing gas moves to the anode side by the back diffusion water.

Here, a fuel cell of the present invention includes: a membrane-electrode assembly including a polymer electrolyte membrane, a first anode catalyst layer and an anode gas diffusion layer sequentially stacked on one of main surfaces of the polymer electrolyte membrane, a second anode catalyst layer disposed between the polymer electrolyte membrane and the first anode catalyst layer, and a cathode catalyst layer and a cathode gas diffusion layer sequentially stacked on the other main surface of the polymer electrolyte membrane; a plate-shaped anode separator having one main surface on which an anode gas channel is formed, and disposed such that the main surface on which the anode gas channel is formed contacts the anode gas diffusion layer; and a plate-shaped cathode separator having one main surface on which a cathode gas channel is formed, and disposed such that the main surface on which the cathode gas channel is formed contacts the cathode gas diffusion layer, wherein the second anode catalyst layer contains a first catalyst (hereinafter referred to as "first sulfur compound adsorption catalyst") which adsorbs a sulfur compound.

With this configuration, even if the sulfur compound moves from the cathode side to the anode side by the back diffusion water, the sulfur compound is adsorbed by the second anode catalyst layer (first sulfur compound adsorption catalyst) disposed in the anode and near the polymer electrolyte membrane. Therefore, the poisoning of the anode by the sulfur compound is suppressed. With this, the voltage reduction caused by the poisoning of the anode is suppressed, and the operation of the fuel cell becomes stable.

The configuration of Patent Document 2 is related to the present invention in that the anode catalyst layer is formed to include two layers. However, in accordance with the configuration specifically described in Patent Document 2, in order to suppress the poisoning of the anode by CO contained in the fuel gas, a CO-resistant catalyst is used as one of two catalyst layers, i.e., as a catalyst layer which is located in the anode and farther from the polymer electrolyte membrane (in other words, as a catalyst layer which is located closer to the anode gas channel). Therefore, in accordance with the configuration of Patent Document 2, in a case where the fuel cell is operated under the low humidification condition and the sulfur compound moves from the cathode side to the anode side by the back diffusion water, the catalyst layer which is located in the anode and closer to the polymer electrolyte membrane is thought to be poisoned by the sulfur compound. Therefore, unlike the present invention, the configuration of Patent Document 2 cannot obtain the effect of suppressing the poisoning of the anode by the sulfur compound moving from the cathode side to the anode side by the back diffusion water. In this regard, the operational advantage of the present invention is significantly different from that of Patent Document 2.

Further, the present inventors have specifically studied as below.

The present inventors have manufactured a cell (single fuel cell) shown in FIG. 14 using a normal membrane-electrode assembly and using an anode separator and a cathode separator configured such that the fuel gas and the oxidizing gas form the parallel flow. Moreover, the present inventors has carried out such an experiment that while constantly maintaining the whole amount of electric power generation under the low humidification condition using a current collector having a main surface divided into 27 regions along the cathode gas channel (a portion corresponding to an uppermost stream region of the cathode gas channel is a region P1, and a portion corresponding to a lowermost stream region of the cathode gas channel is a region P27) (FIG. 15 shows only 27 divided regions of the current collector) with respect to the cathode separator as shown in FIG. 15, $SO_2$ is mixed in the oxidizing gas, and the amount of electric power generation (current) is measured for each region (regions P1 to P27). Here, the "low humidification condition" is a condition in which the operating temperature of the fuel cell is higher than each of the dew point of the fuel gas flowing through the anode gas channel and the dew point of the oxidizing gas flowing through the cathode gas channel. For example, it is preferable that the low humidification condition be a condition in which the operating temperature of the fuel cell is in a range from 75 to 120° C., the dew point of the fuel gas supplied to the anode gas channel is in a range from 50 to 70° C., and the dew point of the oxidizing gas supplied to the cathode gas channel is in a range from 35 to 70° C.

As a result, first, the reduction in the amount of electric power generation was confirmed in the upstream portion (regions P1 to P9) of the cathode gas channel. Next, the amount of electric power generation was steeply decreased in the midstream portion (regions P10 to P21) about 80 hours after the mixing of $SO_2$, and the amount of electric power generation was steeply decreased in the upstream portion (regions P1 to P9) about 100 hours after the mixing of $SO_2$.

The present inventors have studied the above result as below. First, the reason why the amount of electric power generation in the upstream portion (regions P1 to P9) decreases for 80 hours after the mixing of $SO_2$ is thought to be because the upstream portion of the cathode catalyst layer is poisoned by $SO_2$. This phenomenon is observed in a case where the same experiment is carried out under the full humidification condition. Moreover, the reason why steep decreases in the amount of electric power generation in the midstream portion (regions P10 to P21) and the amount of electric power generation in the upstream portion (regions P1 to P9) which occur in a case where $SO_2$ is further mixed occur is thought to be because the anode catalyst layer is poisoned by $SO_2$. The steep decrease in the amount of electric power generation in the midstream portion and the upstream portion is a unique phenomenon observed under the low humidification condition.

To be specific, the present inventors have thought that in a case where the fuel cell is operated under the low humidification condition, the water generated in the cathode by the electric power generating reaction moves from the cathode side through the polymer electrolyte membrane to the anode side by the back diffusion, and $SO_2$ moves to the anode side by the back diffusion water to poison the anode. Here, since the water is generated by the electric power generating reaction, the amount of water in the cathode is larger on the downstream side. Moreover, the amount of the sulfur compound contained in the oxidizing gas is larger on the upstream side since the sulfur compound is oxidized by or adsorbed by the cathode catalyst layer or dissolves in the water in the cathode. Therefore, the amount of the sulfur compound moving from the cathode side to the anode side is the largest at the midstream portion where the back diffusion water and the sulfur compound exist in a balanced manner, and is the second largest at the upstream portion where the concentration of the sulfur compound is high. Therefore, the poisoning of the anode catalyst layer is thought to have occurred in order of the midstream portion and the upstream portion.

Here, in the fuel cell of the present invention, in a case where a portion including an upstream end of the cathode gas channel is defined as an upstream portion, a portion including a downstream end of the cathode gas channel is defined as a downstream portion, and a portion other than the upstream portion and the downstream portion of the cathode gas channel is defined as a midstream portion, the second anode catalyst layer is disposed between the polymer electrolyte membrane and a portion of the first anode catalyst layer which portion is opposed to the midstream portion of the cathode gas channel.

With this configuration, since the second anode catalyst layer disposed at a portion opposed to the midstream portion of the cathode gas channel which portion tends to be poisoned by the sulfur compound moved by the back diffusion water adsorbs the sulfur compound, the poisoning of the anode is accurately suppressed. With this, the voltage reduction caused by the poisoning of the anode is suppressed, and the operation of the fuel cell becomes stable. Moreover, since the second anode catalyst layer is disposed only on a portion where the second anode catalyst layer is necessary, the waste of the catalyst layer can be avoided.

Here, the position of the "midstream portion" of the cathode gas channel changes depending on the operating temperature of the fuel cell, the dew point of the anode gas, the dew point of the cathode gas, the configurations of the channels formed on the anode separator and the cathode separator, and the like. Therefore, the position of the midstream portion of the cathode gas channel may be suitably determined by measuring the electric power generation distribution of the fuel cell in a state where the above-described impurity (sulfur compound) is mixed.

A third anode catalyst layer may be disposed between the polymer electrolyte membrane and a portion of the first anode catalyst layer which portion is opposed to an upstream portion of the cathode gas channel, and the third anode catalyst layer may contain a second catalyst which adsorbs the sulfur compound.

With this configuration, as with the midstream portion, the third anode catalyst layer disposed at a portion opposed to the upstream portion of the cathode gas channel which portion tends to be poisoned by the sulfur compound moved by the back diffusion water adsorbs the sulfur compound. Therefore, the poisoning of the anode is suppressed more preferably, and the operation of the fuel cell becomes further stable.

It is preferable that the first sulfur compound adsorption catalyst be formed by a metal which dissociates and adsorbs the sulfur compound and be supported by a catalyst carrier formed by a metal oxide.

With this configuration, since the catalyst can highly dispersively support the metal which dissociates and adsorbs the sulfur compound, the material cost of the sulfur adsorbing catalyst can be reduced.

It is preferable that the first sulfur compound adsorption catalyst contain elemental ruthenium. Since ruthenium has a high sulfur compound dissociation and adsorption ability, the poisoning of the anode can be preferably suppressed.

It is preferable that the metal oxide constituting the catalyst carrier be at least one metal oxide selected from the group consisting of titanium oxide, silicon oxide, aluminum oxide, and zirconium oxide.

With this configuration, as the carrier supporting the first sulfur compound adsorption catalyst of the second anode catalyst layer, it is possible to use titanium oxide, silicon oxide, aluminum oxide, or zirconium oxide, that is a material higher in resistivity than carbon and stable when the MEA is under an acid atmosphere. By using, as the material of the catalyst carrier of the second anode catalyst layer, titanium oxide, silicon oxide, aluminum oxide, or zirconium oxide, which is lower in electrical conductivity (higher in resistivity) than the carbon that is a material of the catalyst carrier of the first anode catalyst layer, the second anode catalyst layer is unlikely to be affected by the potential of the first anode catalyst layer. Therefore, the change in the potential of the second anode catalyst layer can be suppressed, and the elution of the first sulfur compound adsorption catalyst to the polymer electrolyte membrane or the first anode catalyst layer can be suppressed more preferably. With this, the poisoning of the anode is suppressed more preferably, and the operation of the fuel cell becomes further stable.

It is preferable that the metal oxide constituting the catalyst carrier be an insulator. With this configuration, the elution of the first sulfur compound adsorption catalyst to the polymer electrolyte membrane or the first anode catalyst layer can be suppressed more preferably. As the insulator, it is preferable to use at least one metal oxide selected from the group consisting of silicon oxide, aluminum oxide, and zirconium oxide.

The second anode catalyst layer may further contain a metal containing as a constituent element at least one selected from the group consisting of platinum, aluminum, silicon, titanium, vanadium, chromium, manganese, iron, cobalt, nickel, copper, zinc, molybdenum, rhodium, palladium, silver, tin, tantalum, tungsten, rhenium, osmium, iridium, and gold.

With this configuration, the adsorption of the sulfur compound moved to the anode side by the back diffusion water is accelerated by these catalyst metals.

It is preferable that an operating temperature of the fuel cell be higher than each of a dew point of a fuel gas flowing through the anode gas channel and a dew point of an oxidizing gas flowing through the cathode gas channel.

With this configuration, the fuel cell operates under the so-called low humidification condition. With this, the reductions in cost and size of the fuel cell are realized. Further, the poisoning of the anode catalyst layer is suppressed in a case where the fuel cell is operated under the low humidification condition.

A membrane-catalyst layer assembly of the present invention includes: a polymer electrolyte membrane; a first anode catalyst layer stacked on one of main surfaces of the polymer electrolyte membrane; a second anode catalyst layer disposed between the polymer electrolyte membrane and the first anode catalyst layer; and a cathode catalyst layer stacked on the other main surface of the polymer electrolyte membrane, wherein the second anode catalyst layer contains a catalyst (hereinafter referred to as "sulfur compound adsorption catalyst") which adsorbs a sulfur compound.

It is preferable that in the membrane-catalyst layer assembly, the sulfur compound adsorption catalyst be formed by a metal which dissociates and adsorbs the sulfur compound and be supported by a catalyst carrier formed by a metal oxide.

It is preferable that in the membrane-catalyst layer assembly, the sulfur compound adsorption catalyst be formed by elemental ruthenium.

It is preferable that in the membrane-catalyst layer assembly, the metal oxide constituting the catalyst carrier be at least one metal oxide selected from the group consisting of titanium oxide, silicon oxide, aluminum oxide, and zirconium oxide.

It is preferable that in the membrane-catalyst layer assembly, the metal oxide constituting the catalyst carrier be an insulator.

A membrane-electrode assembly of the present invention includes: any one of the above membrane-catalyst layer assemblies; an anode gas diffusion layer stacked on the anode catalyst layer of the membrane-catalyst layer assembly; and a cathode gas diffusion layer stacked on the cathode catalyst layer of the membrane-catalyst layer assembly, wherein the first anode catalyst layer, the second anode catalyst layer, and the anode gas diffusion layer constitute an anode, and the cathode catalyst layer and the cathode gas diffusion layer constitute a cathode.

Effects of the Invention

The fuel cell, the membrane-electrode assembly, and the membrane-catalyst layer assembly of the present invention are configured as above. Therefore, in a case where the fuel cell is operated under the so-called low humidification condition, the voltage reduction caused by the poisoning of the anode is suppressed, and the operation of the fuel cell becomes stable.

BEST MODE FOR CARRYING OUT THE INVENTION

Hereinafter, preferred embodiments of the present invention will be explained in reference to the drawings. In the drawings, the same reference numbers are used for the same or corresponding components, and a repetition of the same explanation is avoided.

Embodiment 1

FIG. 1 is a cross-sectional view schematically showing a schematic configuration of a cell constituting a fuel cell of Embodiment 1 of the present invention. FIG. 2 are plan views showing a schematic configuration of an anode separator constituting the cell of FIG. 1. FIG. 2(a) is a plan view showing a main surface on which an anode gas channel is formed. FIG. 2(b) is a plan view showing a main surface on which a heat medium channel is formed. FIG. 3 are plan views showing a schematic configuration of a cathode separator constituting the cell of FIG. 1. FIG. 3(a) is a plan view showing a main surface on which a cathode gas channel is formed. FIG. 3(b) is a plan view showing a main surface on which the heat medium channel is formed. FIG. 4 is a cross-sectional view showing a schematic configuration of a membrane-electrode assembly constituting the cell of FIG. 1. FIG. 5 is a perspective view showing a schematic configuration of a membrane-catalyst layer assembly constituting the cell of FIG. 1. FIG. 6 is a cross-sectional view taken along line VI-VI of FIG. 5 and showing the membrane-catalyst layer assembly of FIG. 5. FIG. 7 is a perspective view showing a state where a second anode catalyst layer is stacked on a polymer electrolyte membrane. FIG. 8 is a plan view showing the state where the second anode catalyst layer is stacked on the polymer electrolyte membrane in FIG. 7, when viewed from a first anode catalyst layer side. Since FIG. 1 is a schematic cross-sectional view, the number of channels in FIG. 1 does not exactly correspond to that in each of FIGS. 2, 3, and 8. Hereinafter, the fuel cell, the membrane-electrode assembly, and the membrane-catalyst layer assembly according to the present embodiment will be explained in reference to FIGS. 1 to 8.

As shown in FIG. 1, the fuel cell of the present embodiment includes cells (single fuel cells) 100 each having a membrane-electrode assembly 10, an anode separator 20 and a cathode separator 30 sandwiching the membrane-electrode assembly 10, and a pair of gaskets 40 and 50.

As shown in FIG. 2, the anode separator 20 is formed to have a flat plate shape. Each of an anode gas supplying manifold hole 23, an anode gas discharging manifold hole 24, a cathode gas supplying manifold hole 25, a cathode gas discharging manifold hole 26, a heat medium supplying manifold hole 27, and a heat medium discharging manifold hole 28 are formed to penetrate the anode separator 20 in a thickness direction of the anode separator 20. As shown in FIG. 2(a), an anode gas channel 21 is formed on one of main surfaces of the anode separator 20. The anode gas channel 21 is formed to connect the anode gas supplying manifold hole 23 and the anode gas discharging manifold hole 24. The anode gas channel 21 is formed to have a serpentine shape. Microscopically, the fuel gas in the anode gas channel 21 flows along a serpentine channel (arrow $g_2$). Macroscopically, the fuel gas in the anode gas channel 21 flows from an upper side to a lower side in FIG. 2(a) (arrow $G_2$). As shown in FIG. 2(b), a heat medium channel 22 is formed on the other main surface of the anode separator 20. The heat medium channel 22 is formed to connect the heat medium supplying manifold hole 27 and the heat medium discharging manifold hole 28. The heat medium channel 22 is formed to have a serpentine shape. The anode separator 20 is constituted by an electrically-conductive material, for example, a metal material, such as a graphite material or SUS. Herein, the anode separator 20 is constituted by a resin-impregnated graphite plate formed by impregnating a graphite plate with a phenol resin and hardening the plate.

As shown in FIG. 3, the cathode separator 30 is formed to have a flat plate shape. Each of a cathode gas supplying manifold hole 35, a cathode gas discharging manifold hole 36, an anode gas supplying manifold hole 33, an anode gas discharging manifold hole 34, a heat medium supplying manifold hole 37, and a heat medium discharging manifold hole 38 is formed to penetrate the cathode separator 30 in a thickness direction of the cathode separator 30. As shown in FIG. 3(a), a cathode gas channel 31 is formed on one of main surfaces of the cathode separator 30. The cathode gas channel 31 has an upstream end 31A connected to the cathode gas supplying manifold hole 35 and a downstream end 31B connected to the cathode gas discharging manifold hole 36. A portion of the cathode gas channel 31 which portion includes the upstream end 31A is defined as an upstream portion. A portion of the cathode gas channel 31 which portion includes the downstream end 31B is defined as a downstream portion. A portion of the cathode gas channel 31 other than the upstream portion and the downstream portion is defined as a midstream portion. The upstream portion, the midstream portion, and the downstream portion are determined by a below-described experimental example of an electric power generation distribution. Positions of boundaries of the upstream portion, the midstream portion, and the downstream portion change depending on the configuration of the cathode gas channel 31, an operating temperature of the fuel cell, a dew point of the fuel gas supplied to the anode gas channel 21, a dew point of the oxidizing gas supplied to the cathode gas channel 31, and the like. The definitions of the upstream portion, the midstream portion, and the downstream portion are the same in the other embodiments described below. The cathode gas channel 31 is formed to have a serpentine shape. Microscopically, the oxidizing gas in the cathode gas channel 31 flows along a serpentine channel (arrow $g_1$). Macroscopically, the oxidizing gas in the cathode gas channel 31 flows from an upper side to a lower side in FIG. 3(a) (arrow $G_1$). As shown in FIG. 3(b), a heat medium channel 32 is formed on the other main surface of the cathode separator 30. The heat medium channel 32 is formed to connect the heat medium supplying manifold hole 37 and the heat medium discharging manifold hole 38. The heat medium channel 32 is formed to have a serpentine shape. The cathode separator 30 is constituted by an electrically-conductive material, for example, a metal material, such as a graphite material or SUS. Herein, the cathode separator 30 is constituted by a resin-impregnated graphite plate formed by impregnating a graphite plate with a phenol resin and hardening the plate.

With this configuration, the macroscopic flow $G_2$ of the fuel gas flowing through the anode gas channel 21 of the anode separator 20 and the macroscopic flow $G_1$ of the oxidizing gas flowing through the cathode gas channel 31 of the cathode separator 30 are substantially in parallel with each other. To be specific, the macroscopic flow $G_2$ of the fuel gas and the macroscopic flow $G_1$ of the oxidizing gas form a parallel flow.

In the foregoing, each of the anode gas channel 21, the cathode gas channel 31, and the heat medium channels 22 and 32 is formed to have a serpentine shape. However, the present embodiment is not limited to this. To be specific, the anode separator 20 may be configured in any manner as long as the fuel gas flows substantially the entire region of one of the main surfaces, and the heat medium flows substantially the entire region of the other main surface. Similarly, the cathode separator 30 may be configured in any manner as long as the oxidizing gas flows substantially the entire region of one of the main surfaces, and the heat medium flows substantially the entire region of the other main surface.

As shown in FIG. 4, the membrane-electrode assembly 10 is constituted by a membrane-catalyst layer assembly 9, an anode gas diffusion layer 4, and a cathode gas diffusion layer 5. As shown in FIGS. 5 and 6, the membrane-catalyst layer assembly 9 is constituted by a polymer electrolyte membrane 1, an anode catalyst layer 2, and a cathode catalyst layer 3. The anode catalyst layer 2 and the anode gas diffusion layer 4 constitute an anode 6. The cathode catalyst layer 3 and the cathode gas diffusion layer 5 constitute a cathode 7. Configurations of the membrane-electrode assembly 10 and the membrane-catalyst layer assembly 9 will be explained later in detail.

Each of a pair of gaskets 40 and 50 is formed to have a rectangular ring shape (frame-shape). The gasket 40 is disposed between the polymer electrolyte membrane 1 and the anode separator 20. An anode gas supplying manifold hole (not shown), an anode gas discharging manifold hole (not shown), a cathode gas supplying manifold hole (not shown), a cathode gas discharging manifold hole (not shown), a heat medium supplying manifold hole (not shown), and a heat medium discharging manifold hole (not shown) are formed on the gasket 40. The gasket 50 is disposed between the polymer electrolyte membrane 1 and the cathode separator 30. As with the gasket 40, the anode gas supplying manifold hole (not shown), the anode gas discharging manifold hole (not shown), the cathode gas supplying manifold hole (not shown), the cathode gas discharging manifold hole (not shown), the heat medium supplying manifold hole (not shown), and the heat medium discharging manifold hole (not shown) are formed on the gasket 50. Each of the gaskets 40 and 50 is constituted by, for example, an adhesive or a liquid adhesive (adhesive using polybutadiene, polyisoprene, polychloroprene, silicon rubber, fluorocarbon rubber, acrylonitrile-butadiene rubber, or the like) using fluorocarbon rubber, silicon rubber, natural rubber, ethylene-propylene rubber (EPDM), butyl rubber, butyl chloride rubber, butylbromide rubber, butadiene rubber, styrene-butadiene copolymer, ethylene-vinyl acetate rubber, acryl rubber, polyisopropylene polymer, perfluoro carbon, thermoplastic elastomer (such as polystyrene-based elastomer, polyolefin-based elastomer, polyester-based elastomer, or polyamide-based elastomer), or latex (such as isoprene rubber or butadiene rubber).

The cells 100 each configured as above are stacked in the thickness direction of the cell to form a cell stack body. Fuel gas supplying manifold holes, fuel gas discharging manifold holes, oxidizing gas supplying manifold holes, oxidizing gas discharging manifold holes, heat medium supplying manifold holes, and heat medium discharging manifold holes formed on the anode separator 20, the cathode separator 30, and the gaskets 40 and 50 are connected to one another in the thickness direction by stacking the cells 100 (to form the cell stack body) to respectively form a fuel gas supplying manifold, a fuel gas discharging manifold, an oxidizing gas supplying manifold, an oxidizing gas discharging manifold, a heat medium supplying manifold, and a heat medium discharging manifold. An end plate on which a current collector and an insulating plate are disposed is disposed on each of both ends of the cell stack body, and these components are fastened by fastening members to form a cell stack, i.e., the fuel cell.

Next, the configurations of the membrane-electrode assembly 10 and the membrane-catalyst layer assembly 9 will be explained.

The polymer electrolyte membrane 1 is formed to have a rectangular film shape (see FIG. 8). The polymer electrolyte membrane 1 has proton conductivity. In the polymer electrolyte membrane 1, it is preferable to use a polymer electrolyte containing a sulfonic acid group, a carboxylic acid group, a phosphonic acid group, or a sulfonimide group as a positive ion exchange group. In view of the proton conductivity, it is especially preferable to use the polymer electrolyte containing the sulfonic acid group.

As a resin which constitutes the polymer electrolyte membrane 1 and contains the sulfonic acid group, dry resin having the ion exchange capacity of 0.5 to 1.5 meq/g is preferable. It is preferable that the ion exchange capacity of the polymer electrolyte constituting the polymer electrolyte membrane 1 be 0.5 meq/g or more, since the increase in the resistance value of the polymer electrolyte membrane 1 at the time of electric power generation can be adequately decreased. Moreover, it is preferable that the ion exchange capacity be 1.5 meq/g or less, since the water content of the polymer electrolyte membrane 1 does not increase, the polymer electrolyte membrane 1 is less likely to swell, and fine holes of the below-described catalyst layer do not clog. From the same viewpoint as above, it is more preferable that the ion exchange capacity be 0.8 to 1.2 meq/g.

It is preferable that the polymer electrolyte constituting the polymer electrolyte membrane 1 be a copolymer containing a polymerization unit based on a perfluorovinyl compound expressed by $CF_2=CF-(OCF_2CFX)_m-O_p-(CF_2)_n-SO_3H$ (m is an integer from 0 to 3, n is an integer from 1 to 12, p is 0 or 1, and X is a fluorine atom or a trifluoromethyl group) and a polymerization unit based on tetrafluoroethylene.

Preferable examples of the perfluorovinyl compound are compounds expressed by Formulas (1) to (3) below. In the following formulas, q is an integer from 1 to 8, r is an integer from 1 to 8, and t is an integer from 1 to 3.

$$CF_2=CFO(CF_2)_q-SO_3H \quad (1)$$

$$CF_2=CFOCF_2CF(CF_3)O(CF_2)_r-SO_3H \quad (2)$$

$$CF_2=CF(OCF_2CF(CF_3))_tO(CF_2)_2-SO_3H \quad (3)$$

A second anode catalyst layer 2B is stacked on one of main surfaces of the polymer electrolyte membrane 1. The second anode catalyst layer 2B is disposed such that one of main surfaces thereof contacts the polymer electrolyte membrane 1. The second anode catalyst layer 2B is disposed on a portion corresponding to the midstream portion of the cathode gas channel 31. Here, the "portion corresponding to the midstream portion of the cathode gas channel 31" is such a portion that the portion and the cathode gas channel 31 sandwich the polymer electrolyte membrane 1 and is a portion opposed to the midstream portion of the cathode gas channel 31.

The second anode catalyst layer 2B contains a catalyst (first sulfur compound adsorption catalyst) which adsorbs a sulfur compound. The first sulfur compound adsorption catalyst is formed to have a particle shape and is supported by a catalyst carrier. It is especially preferable that the first sulfur compound adsorption catalyst contain elemental ruthenium. Herein, the first sulfur compound adsorption catalyst is formed by the elemental ruthenium. The reason for this is that ruthenium has a high sulfur compound dissociation and adsorption ability. Regarding high reactivity of ruthenium with respect to the sulfur compound, see "T. Jirsak et al./ Surface Science 418 (1998) 8-21."

Moreover, the first sulfur compound adsorption catalyst may be formed by platinum as will be explained in Experimental Example 2 below. Even in this case, preferable results can be obtained. Further, in addition to these, the first sulfur compound adsorption catalyst may be formed by a metal containing as a constituent element at least one selected from the group consisting of aluminum, silicon, titanium, vanadium, chromium, manganese, iron, cobalt, nickel, copper, zinc, molybdenum, rhodium, palladium, silver, tin, tantalum, tungsten, rhenium, osmium, iridium, and gold. Here, the sulfur compound adsorption catalyst is a material (substance) containing a metal capable of dissociating and adsorbing the sulfur compound on a surface thereof.

It is preferable that the diameter of each particle of the first sulfur compound adsorption catalyst be in a range from 1 to 50 nm. It is preferable that the diameter of the particle of the first sulfur compound adsorption catalyst be 50 nm or less, since a surface area becomes large, and a poisoning constituent adsorption capacity is high. It is preferable that the diameter of the particle of the first sulfur compound adsorption catalyst be 1 nm or more, since it is industrially easy to prepare platinum particles.

In order to increase a sulfur compound adsorption activity, the second anode catalyst layer 2B may further contain a metal containing as a constituent element at least one selected from the group consisting of platinum, aluminum, silicon, titanium, vanadium, chromium, manganese, iron, cobalt, nickel, copper, zinc, molybdenum, rhodium, palladium, silver, tin, tantalum, tungsten, rhenium, osmium, iridium, and gold.

It is preferable that the catalyst carrier supporting the first sulfur compound adsorption catalyst be formed by a metal oxide. The first reason for this is that in the case of the same metal, the metal oxide has a larger surface area than the elemental metal, so that a catalyst supporting rate can be made high. The second reason for this is that in the case of the same metal, the metal oxide has a lower electrical conductivity than the elemental metal, and as a result, the elution of the first sulfur compound adsorption catalyst to the polymer electrolyte membrane 1 or the first anode catalyst layer 2A can be suppressed. The reason for this will be described below.

The first anode catalyst layer 2A and the anode gas diffusion layer 4 constitute the anode 6. The potential of the first anode catalyst layer 2A changes by the electric power generation and stop of the fuel cell 100. If the catalyst carrier supporting the first sulfur compound adsorption catalyst in the second anode catalyst layer 2B is high in electrical conductivity (low in resistivity), the potential of the first sulfur compound adsorption catalyst contained in the second anode catalyst layer 2B changes in accordance with the potential of the first anode catalyst layer 2A. As a result, the material constituting the first sulfur compound adsorption catalyst may elute off. Here, by lowering the electrical conductivity of the catalyst carrier supporting the first sulfur compound adsorption catalyst, the elution of the material constituting the first sulfur compound adsorption catalyst can be suppressed.

Therefore, from this viewpoint, it is preferable that the catalyst carrier supporting the first sulfur compound adsorption catalyst be formed by the metal oxide, and in addition, formed by a substance (hereinafter referred to as "high resistor") having low electrical conductivity (high resistivity). From experience, the resistivity of the high resistor may be substantially ten to the power 5 or more. A preferable material of the high resistor is at least one metal oxide selected from the group consisting of titanium oxide, silicon oxide, aluminum oxide, and zirconium oxide.

Moreover, from the above-described viewpoint, it is further preferable that the catalyst carrier supporting the first sulfur compound adsorption catalyst be formed by the metal oxide, and in addition, formed by an insulator. Here, the definition of the insulator in the present invention is the same as the general definition of an insulator. To be specific, the insulator in the present invention is defined as a material having the resistivity of ten to the power 8 Ωm or more ("Semiconductor Engineering for Integrated Circuit" published by Kogyo Chosakai Publishing, Inc. (1992), written by Akira Usami, Shinji Kanebou, Takao Maekawa, Hajime Tomokage, Morio Inoue).

A preferable material of the insulator is at least one metal oxide selected from the group consisting of silicon oxide, aluminum oxide, and zirconium oxide.

In the present embodiment, the catalyst carrier supporting the first sulfur compound adsorption catalyst is formed by titanium oxide since titanium oxide has high resistivity, and a large surface area can be obtained comparatively easily as the catalyst carrier. Moreover, the catalyst carrier is formed to have a particle shape.

It is preferable that titanium oxide particles constituting the catalyst carrier supporting the first sulfur compound adsorption catalyst have a specific surface area of from 10 to 500 $m^2/g$. It is preferable that the specific surface area be 10 $m^2/g$ or more, since it is easy to reduce the diameter of the particle of the first sulfur compound adsorption catalyst, and the poisoning constituent adsorption capacity can therefore be increased. It is preferable that the specific surface area be 500 $m^2/g$ or less, since it is industrially easy to prepare the titanium oxide particles.

It is preferable that the catalyst supporting rate of the titanium oxide contained in the second anode catalyst layer 2B be in a range from 1 to 50 wt %. It is preferable that the catalyst supporting rate of the titanium oxide be 1 wt % or more, since the thickness of the second anode catalyst layer 2B necessary for obtaining a predetermined poisoning constituent adsorption capacity can be reduced, and an original electric power generating performance of the fuel cell does not deteriorate. It is preferable that the catalyst supporting rate of the titanium oxide be 50 wt % or less, since it is easy to reduce the diameter of the particle of the first sulfur compound adsorption catalyst, the poisoning constituent adsorption capacity can be made high.

As above, in order to stack the second anode catalyst layer 2B on the polymer electrolyte membrane 1, used is, for example, a method for spraying, applying, or filtering and transferring a dispersing liquid, prepared by dispersing the titanium oxide particles in a dispersion medium, with respect to the polymer electrolyte membrane 1.

Moreover, the second anode catalyst layer 2B may contain a binder. In a case where the second anode catalyst layer 2B contains the binder, the strength of the second anode catalyst layer 2B increases, and the second anode catalyst layer 2B can be efficiently formed on the polymer electrolyte membrane 1. It is especially preferable that the binder has proton conductivity, since the proton conductivity of the second anode catalyst layer 2B increases, and the original electric power generating performance of the fuel cell does not deteriorate. As such binder, a Nafion solution (produced by Du Pont Kabushiki Kaisha: trademark), a Flemion solution (produced by Asahi Glass Co., Ltd.: trademark), or the like is used.

As described above, in a case where the second anode catalyst layer 2B contains the binder, a composite membrane formed by the titanium oxide particles and the binder is first formed by casting a dispersing liquid prepared by dispersing the titanium oxide particles and the binder in a dispersion medium. Then, the composite membrane is attached to the polymer electrolyte membrane 1 by various known methods. Thus, the second anode catalyst layer is formed on the polymer electrolyte membrane 1.

The first anode catalyst layer 2A is stacked on the polymer electrolyte membrane 1 so as to cover a main surface of the second anode catalyst layer 2B which surface is opposite a main surface contacting the polymer electrolyte membrane 1. In other words, the first anode catalyst layer 2A is formed on one of main surfaces of the polymer electrolyte membrane 1, and the second anode catalyst layer 2B is disposed between the polymer electrolyte membrane 1 and the first anode catalyst layer 2A. The first anode catalyst layer 2A contacts the polymer electrolyte membrane 1 at a portion corresponding to the upstream portion of the cathode gas channel 31 and a portion corresponding to the downstream portion of the cathode gas channel 31. Here, the "portion corresponding to the upstream portion of the cathode gas channel 31" is such a portion that the portion and the cathode gas channel 31 sandwich the polymer electrolyte membrane 1 and is a portion opposed to the upstream portion of the cathode gas channel 31, and the "portion corresponding to the downstream portion of the cathode gas channel 31" is such a portion that the portion and the cathode gas channel 31 sandwich the polymer electrolyte membrane 1 and is a portion opposed to the downstream portion of the cathode gas channel 31.

A portion of the first anode catalyst layer 2A which portion corresponds to the midstream portion of the cathode gas channel projects by the thickness of the second anode catalyst layer 2B with respect to the other portion (projection and depression are formed). However, these projection and depression are absorbed by the anode gas diffusion layer 4 described below.

The cathode catalyst layer 3 is stacked on the other main surface of the polymer electrolyte membrane 1. The cathode catalyst layer 3 is disposed such that one of main surfaces thereof contacts the polymer electrolyte membrane 1.

Materials constituting the first anode catalyst layer 2A and the cathode catalyst layer 3 are not especially limited as long as the effects of the present invention can be obtained. For example, each of the first anode catalyst layer 2A and the cathode catalyst layer 3 may contain an electrode catalyst, electrically-conductive carbon particles (powder) as the catalyst carrier supporting the electrode catalyst, and the polymer electrolyte having positive ion (hydrogen ion) conductivity, and each of the first anode catalyst layer 2A and the cathode catalyst layer 3 may further contain a water-repellent material, such as polytetrafluoroethylene. The material constituting the first anode catalyst layer 2A and the material constituting the cathode catalyst layer 3 may be the same as each other or different from each other.

Further, each of the first anode catalyst layer 2A and the cathode catalyst layer 3 may be formed by using a method for manufacturing a catalyst layer of a gas diffusion electrode in a normal fuel cell. For example, each of the first anode catalyst layer 2A and the cathode catalyst layer 3 may be formed by preparing and using a liquid (catalyst layer forming ink) containing at least a dispersion medium and a material (for example, the electrically-conductive carbon particles as the catalyst carrier supporting the electrode catalyst and the polymer electrolyte) constituting the first anode catalyst layer 2A or the cathode catalyst layer 3.

As the polymer electrolyte used herein, the same material as the above-described material constituting the polymer electrolyte membrane 1 may be used, or the different material from the above-described material constituting the polymer electrolyte membrane 1 may be used. Moreover, metal particles can be used as the electrode catalyst. The metal (metal particles) is not especially limited, and various metals may be used. In light of an electrode reaction activity, it is preferable that the metal of the electrode catalyst be at least one metal selected from the group consisting of platinum, gold, silver, ruthenium, rhodium, palladium, osmium, iridium, chromium, iron, titanium, manganese, cobalt, nickel, molybdenum, tungsten, aluminum, silicon, zinc, and tin. Among these metals, platinum or an alloy of platinum and at least one selected from the above group is preferable. An alloy of platinum and ruthenium is especially preferable since the activity of the catalyst in the anode catalyst layer 2 becomes stable.

Moreover, it is preferable that a mean diameter of the metal particle used as the electrode catalyst be in a range from 1 to 10 nm. It is preferable that the mean diameter of the metal particle be 1 nm or more, since it is industrially easy to prepare. Moreover, it is preferable that the mean diameter of the metal particle be 10 nm or less, since the activity of the electrode catalyst per mass is easily secured more adequately, and this leads to the cost reduction.

It is preferable that the specific surface area of the electrically-conductive carbon particle used as the catalyst carrier be in a range from 50 to 1500 $m^2/g$. It is preferable that the specific surface area of the electrically-conductive carbon particle be 50 $m^2/g$ or more, since it is easy to increase the supporting rate of the electrode catalyst, and output characteristics of the obtained anode catalyst layer 2 and cathode catalyst layer 3 can be secured more adequately. Moreover, it is preferable that the specific surface area of the electrically-conductive carbon particle be 1500 $m^2/g$ or less, since fine holes of adequate size can be secured more easily, covering by the polymer electrolyte becomes easier, and the output characteristics of the anode catalyst layer 2 and the cathode catalyst layer 3 can be secured more adequately. Further, from the same viewpoint as above, it is more preferable that the specific surface area of the electrically-conductive carbon particle be in a range from 200 to 900 $m^2/g$.

Moreover, it is preferable that the mean diameter of the electrically-conductive carbon particle used as the catalyst carrier be in a range from 0.01 to 1.0 μm. It is preferable that the mean diameter of the electrically-conductive carbon particle be 0.01 μm or more, since a gas diffusivity in each of the anode catalyst layer 2 and the cathode catalyst layer 3 is easily secured more adequately, and flooding can be prevented more securely. Moreover, it is preferable that the mean diameter of the electrically-conductive carbon particle be 1.0 μm or less, since a satisfactory covering state of the electrode catalyst by the polymer electrolyte is easily realized, a covering area of the electrode catalyst by the polymer electrolyte is easily secured more adequately, and an adequate electrode performance is therefore secured more easily.

The anode gas diffusion layer 4 is stacked on the first anode catalyst layer 2A. The anode gas diffusion layer 4 is disposed on a main surface of the first anode catalyst layer 2A which surface is farther from the polymer electrolyte membrane 1. Herein, the area of the main surface of the anode gas diffusion layer 4 and the area of the main surface of the first anode catalyst layer 2A are the same as each other. However, the present embodiment is not limited to this. For example, the area of the main surface of the anode gas diffusion layer 4 may be larger than the area of the main surface of the first anode catalyst layer 2A.

The cathode gas diffusion layer 5 is stacked on the cathode catalyst layer 3. The anode gas diffusion layer 5 is disposed on a main surface of the cathode catalyst layer 3 which surface is farther from the polymer electrolyte membrane 1. Herein, the area of the main surface of the cathode gas diffusion layer 5 and the area of the main surface of the cathode catalyst layer 3 are the same as each other. However, the present embodiment is not limited to this. For example, the area of the main surface of the cathode gas diffusion layer 5 may be larger than the area of the main surface of the cathode catalyst layer 3.

The configurations of the anode gas diffusion layer 4 and the cathode gas diffusion layer 5 are not especially limited as long as the effects of the present invention can be obtained. Moreover, the configuration of the anode gas diffusion layer 4 and the configuration of the cathode gas diffusion layer 5 may be the same as each other or different from each other.

For example, an electrically conductive base material having a porous structure and manufactured using carbon fine powder having large specific surface area, pore-forming material, carbon paper, or carbon cloth to obtain gas permeability may be used as the anode gas diffusion layer 4 and the cathode gas diffusion layer 5. For example, each of the anode gas diffusion layer 4 and the cathode gas diffusion layer 5 is formed by carbon woven fabric, carbon nonwoven fabric, carbon paper, carbon powder sheet, or the like. Moreover, in order to obtain an adequate drainage property, for example, water-repellent polymer, such as fluorocarbon resin, may be dispersed in the anode gas diffusion layer 4 and the cathode gas diffusion layer 5. Further, in order to obtain adequate electron conductivity, each of the anode gas diffusion layer 4 and the cathode gas diffusion layer 5 may be formed by carbon fiber, metal fiber, or electron-conductive material, such as carbon fine powder.

A water-repellent carbon layer formed by water-repellent polymer and carbon powder may be disposed between the anode gas diffusion layer 4 and the first anode catalyst layer 2A and between the cathode gas diffusion layer 5 and the cathode catalyst layer 3. With this, water control in the membrane-electrode assembly 10 (retention of water necessary for maintaining satisfactory properties of the membrane-electrode assembly 10, and quick discharge of unnecessary water) can be carried out more easily and more surely.

Next, a method for manufacturing the membrane-electrode assembly 10 constituting the fuel cell of the present embodiment will be explained in reference to FIGS. 4 to 6. A method for manufacturing the fuel cell using the membrane-electrode assembly 10 manufactured as explained below is not especially limited, and a normal fuel cell manufacturing technology can be used, so that a detailed explanation thereof is omitted herein.

First, a supporting unit (such as a supporting base) for supporting the polymer electrolyte membrane 1 and a mask for forming the cathode catalyst layer 3 on the polymer electrolyte membrane 1 are provided. The mask has an opening, and the shape and area of the opening are designed to correspond to the shape and area of the cathode catalyst layer 3. Further, a catalyst layer forming device is disposed above the mask. The catalyst layer forming device includes a mechanism configured to, for example, apply or spray the catalyst layer forming ink to form the cathode catalyst layer 3 on the polymer electrolyte membrane 1 corresponding to the opening of the mask. As this mechanism, a mechanism adopted for forming the catalyst layer of the normal fuel cell may be adopted. For example, a mechanism designed based on a spraying method, a spin coating method, a doctor blade method, a die coating method, or a screen printing may be adopted.

In a state where the mask is disposed on the polymer electrolyte membrane 1, the catalyst layer forming ink is, for example, applied or sprayed by the catalyst layer forming device from above the opening of the mask. Thus, the cathode catalyst layer 3 is formed on the polymer electrolyte membrane 1 corresponding to the opening of the mask.

Next, the polymer electrolyte membrane 1 on which the cathode catalyst layer 3 is formed is turned over, and the second anode catalyst layer 2B is then formed.

As with a case where the cathode catalyst layer 3 is formed on the polymer electrolyte membrane 1, the first anode catalyst layer 2A is formed on the main surface of the polymer electrolyte membrane 1 which surface is opposite to the main surface on which the cathode catalyst layer 3 is formed and on the main surface of the second anode catalyst layer 2B which surface is farther from the polymer electrolyte membrane 1.

Thus, the membrane-catalyst layer assembly 9 is obtained. The cathode gas diffusion layer 5 is joined to the cathode catalyst layer 3 of the membrane-catalyst layer assembly 9 obtained as above. Moreover, the anode gas diffusion layer 4 is joined to the first anode catalyst layer 2A of the membrane-catalyst layer assembly 9. Thus, the membrane-electrode assembly 10 is obtained. Specifically, the cathode gas diffusion layer 5 and the anode gas diffusion layer 4 each having an appropriate size corresponding to the size of the membrane-catalyst layer assembly 10 may be prepared, and the cathode gas diffusion layer 5 may be joined to the cathode catalyst layer 3 by hot pressing or the like and the anode gas diffusion layer 4 may be joined to the first anode catalyst layer 2A by hot pressing or the like.

Next, the following will explain how the poisoning of the anode catalyst layer 2 in the fuel cell, the membrane-electrode assembly 10, and the membrane-catalyst layer assembly 9 according to the present embodiment is suppressed.

First, the fuel cell of the present embodiment is operated under a low humidification condition. The low humidification condition is a condition in which each of the dew point of the fuel gas supplied to the anode gas channel 21 and the dew point of the oxidizing gas supplied to the cathode gas channel 31 is lower than the operating temperature of the fuel cell. In the present embodiment, for example, in the low humidification condition, the operating temperature of the fuel cell is in a range from 60 to 120° C., the dew point of the fuel gas supplied to the anode gas channel 21 is in a range from 50 to 70° C., and the dew point of the oxidizing gas supplied to the cathode gas channel 31 is in a range from 35 to 70° C.

Under the above condition, the fuel gas is supplied to the anode gas channel 21 and the oxidizing gas is supplied to the cathode gas channel 31 to generate electric power by the fuel cell. Used as the fuel gas supplied to the anode gas channel 21 is a hydrogen-containing gas generated by a known hydrogen reformer, a hydrogen gas stored in a hydrogen bomb, or the like. Used as the oxidizing gas of the cathode gas channel 31 is air supplied by a known blower. The air as the oxidizing gas slightly contains the sulfur compound derived from, for example, an exhaust gas of a vehicle. Therefore, in a case where the fuel cell generates the electric power under the low humidification condition, water generated in the cathode gas channel 31 moves from the cathode 7 side through the polymer electrolyte membrane 1 to the anode side by a back diffusion phenomenon (back diffusion water), and the sulfur compound slightly contained in the air moves from the cathode 7 side to the anode 6 side by this back diffusion water. Especially, as can be estimated in the experimental example described below, the amount of the sulfur compound moving at a portion of the anode catalyst layer 2 which portion corresponds to the midstream portion of the cathode gas channel 31 becomes large.

However, in the fuel cell, the membrane-electrode assembly 10, and the membrane-catalyst layer assembly 9 according to the present embodiment, the second anode catalyst layer 2B disposed on the portion corresponding to the midstream portion of the cathode gas channel 31 contains the catalyst which adsorbs the sulfur compound. Therefore, even if the amount of the sulfur compound moving from the cathode 7 side to the anode 6 side at the portion of the anode catalyst layer 2 which portion corresponds to the midstream portion of the cathode gas channel 31 becomes large, the second anode catalyst layer 2B adsorbs the sulfur compound. On this account, the poisoning of the anode 6 (first anode catalyst layer 2A) is suppressed.

Moreover, since the second anode catalyst layer 2B is disposed only on a portion where the second anode catalyst layer 2B is necessary, the waste of the catalyst layer can be avoided.

The foregoing has explained a case where in the fuel cell of the present embodiment, the macroscopic flow $G_2$ of the fuel gas flowing through the anode gas channel 21 and the macroscopic flow $G_1$ of the oxidizing gas flowing through the cathode gas channel 31 form the parallel flow. Needless to say, the present embodiment is applicable to a case where the macroscopic flow $O_2$ of the fuel gas flowing through the anode gas channel 21 and the macroscopic flow $G_1$ of the oxidizing gas flowing through the cathode gas channel 31 form an opposed flow or a cross flow. Even in these cases, the upstream portion, midstream portion, and downstream portion of the cathode gas channel 31 can be determined by carrying out suitable experiments. Then, the second anode catalyst layer 2B supporting the catalyst which adsorbs the sulfur compound is disposed on the portion of the anode catalyst layer 2 which portion corresponds to the midstream portion of the cathode gas channel 31. Thus, the poisoning of the anode 6 (first anode catalyst layer 2A) corresponding to the midstream portion of the cathode gas channel 31 is suppressed.

In summary, in the fuel cell, the membrane-electrode assembly 10, and the membrane-catalyst layer assembly 9 according to the present embodiment, the second anode catalyst layer 2B corresponding to the midstream portion of the cathode gas channel 31 contains the catalyst which adsorbs the sulfur compound. Therefore, even if the sulfur compound moves to the anode 6 by the back diffusion water flowing from the cathode 7 side to the anode 6 side in a case where the fuel cell is operated under the low humidification condition, the sulfur compound is adsorbed by the second anode catalyst layer 2B. With this, a voltage reduction caused by the poisoning of the anode 6 (first anode catalyst layer 2A) is suppressed, and the operation of the fuel cell (cell 100) becomes stable.

Embodiment 2

FIG. 9 is a cross-sectional view schematically showing a schematic configuration of the cell constituting the fuel cell of Embodiment 2 of the present invention. FIG. 10 is a cross-sectional view showing a schematic configuration of the membrane-electrode assembly constituting the cell of FIG. 9. FIG. 11 is a cross-sectional view showing a schematic configuration of the membrane-catalyst layer assembly constituting the cell of FIG. 9. FIG. 12 is a plan view showing the membrane-catalyst layer assembly of FIG. 11 when viewed from the first anode catalyst layer side. In FIG. 9, the heat medium channels formed on the anode separator and the cathode separator are omitted. In addition, since FIG. 9 schematically shows the cross-sectional view, the number of channels in FIG. 9 does not exactly correspond to that in each of FIGS. 2, 3, and 12. Hereinafter, the fuel cell, the membrane-electrode assembly, and the membrane-catalyst layer assembly according to the present embodiment will be explained in reference to FIGS. 9 to 12.

In the fuel cell (cell 100), the membrane-electrode assembly 10, and the membrane-catalyst layer assembly 9 according to the present embodiment, the anode catalyst layer 2 is different in configuration from the anode catalyst layer 2 of Embodiment 1.

To be specific, as shown in FIGS. 9 to 12, a third anode catalyst layer 2C is further disposed between the first anode catalyst layer 2A and the polymer electrolyte membrane 1. The third anode catalyst layer 2C is disposed between a portion opposed to the upstream portion of the cathode gas channel 31 and the polymer electrolyte membrane 1. The third anode catalyst layer 2C contains a catalyst (second sulfur compound adsorption catalyst) which adsorbs the sulfur compound. The second sulfur compound adsorption catalyst is formed in the same manner as the first sulfur compound adsorption catalyst, so that an explanation thereof is omitted. In order to increase the sulfur compound adsorption activity, the third anode catalyst layer 2C may further contain a metal having as a constituent element at least one selected from the group consisting of platinum, aluminum, silicon, titanium, vanadium, chromium, manganese, iron, cobalt, nickel, copper, zinc, molybdenum, rhodium, palladium, silver, tin, tantalum, tungsten, rhenium, osmium, iridium, and gold. The third anode catalyst layer 2C can be formed using a mask designed to realize the shape and area of the third anode catalyst layer 2C. Other than these, the fuel cell, the membrane-electrode assembly, and the membrane-catalyst layer assembly according to the present embodiment are the same as those according to Embodiment 1. Moreover, except for the formation of the third anode catalyst layer 2C, the methods for manufacturing the fuel cell, the membrane-electrode assembly, and the membrane-catalyst layer assembly according to the present embodiment are also the same as those according to Embodiment 1.

The fuel cell, the membrane-electrode assembly 10, and the membrane-catalyst layer assembly 9 according to the present embodiment can obtain the same effects as those according to Embodiment 1.

Moreover, in the fuel cell, the membrane-electrode assembly 10, and the membrane-catalyst layer assembly 9 according to the present embodiment, the third anode catalyst layer 2C containing the catalyst which adsorbs the sulfur compound is disposed between the portion opposed to the upstream portion of the cathode gas channel 31 and the polymer electrolyte membrane 1. Therefore, at the portion of the anode 6 which portion corresponds to the upstream portion and is thought to tend to be poisoned by the sulfur compound as with the portion of the anode 6 which portion corresponds to the midstream portion of the cathode gas channel 31, the third anode catalyst layer 2C adsorbs the sulfur compound having moved from the cathode 7 side to the anode 6 side by the back diffusion water at this portion (portion corresponding to the upstream portion). With this, the poisoning of the anode 6 (first anode catalyst layer 2A) is further suppressed, and the operation of the fuel cell (cell 100) becomes further stable.

The present embodiment has explained a case where the second anode catalyst layer 2B and the third anode catalyst layer 2C are separately provided. However, the second anode catalyst layer 2B may be disposed to extend between the portion opposed to the upstream portion and midstream portion of the cathode gas channel 31 and the polymer electrolyte membrane 1. With this configuration, a step of providing the third anode catalyst layer 2C is omitted, and manufacturing of the membrane-catalyst layer assembly 9, the membrane-electrode assembly 10, and fuel cell (cell 100) becomes therefore easy.

Embodiment 3

FIG. 13 is a cross-sectional view schematically showing a schematic configuration of the cell constituting the fuel cell of Embodiment 3 of the present invention. In FIG. 13, the heat medium channels formed on the anode separator and the cathode separator are omitted. In addition, since FIG. 13 is a schematic cross-sectional view, the number of channels in FIG. 13 does not exactly correspond to that in each of FIGS. 2 and 3. Hereinafter, the fuel cell, the membrane-electrode assembly, and the membrane-catalyst layer assembly according to the present embodiment will be explained in reference to FIG. 13.

As shown in FIG. 13, in the fuel cell, the membrane-electrode assembly 10, and the membrane-catalyst layer assembly 9 according to the present embodiment, the second anode catalyst layer 2B is disposed on the portion corresponding to the upstream portion, midstream portion, and downstream portion of the cathode gas channel 31. To be specific, the second anode catalyst layer 2B is disposed to contact one entire main surface of the polymer electrolyte membrane 1. The first anode catalyst layer 2A is disposed to contact an entire main surface of the second anode catalyst layer 2B which surface is opposed to the main surface contacting the polymer electrolyte membrane 1. Other than these, the fuel cell, the membrane-electrode assembly, and the membrane-catalyst layer assembly 9 according to the present embodiment are the same in configuration as those according to each of Embodiments 1 and 2.

As with the fuel cell, the membrane-electrode assembly, and the membrane-catalyst layer assembly according to Embodiments 1 and 2, in the fuel cell, the membrane-electrode assembly 10, and the membrane-catalyst layer assembly 9 according to the present embodiment, the poisoning of the anode 6 (first anode catalyst layer 2A) is further suppressed, and the operation of the fuel cell becomes further stable.

Moreover, since the fuel cell, the membrane-electrode assembly 10, and the membrane-catalyst layer assembly 9 according to the present embodiment are configured as above, manufacturing thereof becomes easy. To be specific, it becomes unnecessary to prepare masks having different size openings when stacking the second anode catalyst layer 2B and the first anode catalyst layer 2A on the polymer electrolyte membrane 1.

Experimental Example 1

In Experimental Example 1, the amount of electric power generation was measured using a cell 101 of Comparative Example shown in FIG. 14. FIG. 15 is a plan view schematically showing respective regions for measuring the amount of electric power generation from the upstream portion to downstream portion of the cathode gas channel in Experimental Example 1. Hereinafter, the present experimental example will be explained in reference to FIGS. 14 and 15.

First, the cell 101 of Comparative Example will be explained.

FIG. 14 is a cross-sectional view showing a schematic configuration of the cell constituting the fuel cell of Comparative Example. In FIG. 14, the heat medium channels of the anode separator and the cathode separator are omitted.

As shown in FIG. 14, in the fuel cell, the membrane-electrode assembly, and the membrane-catalyst layer assembly according to the present comparative example, the second anode catalyst layer was not disposed between the polymer electrolyte membrane 1 and the first anode catalyst layer 2A. To be specific, only the first anode catalyst layer 2A (normal anode catalyst layer) was disposed to contact one of main surfaces of the polymer electrolyte membrane 1. Other than this, the fuel cell, the membrane-electrode assembly, and the membrane-catalyst layer assembly according to the present comparative example were the same in configuration as the fuel cell, the membrane-electrode assembly 10, and the membrane-catalyst layer assembly 9 according to each of Embodiments 1 and 2.

Next, a method for manufacturing the membrane-electrode assembly 10 constituting the cell 101 of Comparative Example shown in FIG. 14 will be explained.

A cathode catalyst layer forming ink was prepared by dispersing catalyst support particles (Pt catalyst supporting carbon) (produced by Tanaka Kikinzoku Kogyo, 50 mass % thereof is Pt) and a polymer electrolyte solution (produced by Asahi Glass Co., Ltd.: "Flemion" (trademark)) in a mixed dispersion medium of ethanol and water (mass ratio is 1:1). The catalyst support particles were prepared such that platinum particles having the mean diameter of about 3 nm were supported on carbon particles, and the polymer electrolyte solution had hydrogen ion conductivity. The cathode catalyst layer having a certain catalyst surface area over the entire catalyst layer region was formed by applying the cathode catalyst layer forming ink on one of main surfaces of a polymer electrolyte membrane (produced by Japan Gore-Tex Inc.: Product Name "GSII") by the spraying method.

Next, an anode catalyst layer forming ink was prepared by dispersing catalyst support particles (Pt—Ru catalyst supporting carbon) (produced by Tanaka Kikinzoku Kogyo, 50 mass % thereof is an Pt—Ru alloy) and the polymer electrolyte solution (produced by Asahi Glass Co., Ltd.: "Flemion" (trademark)) in a mixed dispersion medium of ethanol and water (mass ratio is 1:1). The catalyst support particles were prepared such that platinum-ruthenium alloy (the mass ratio of platinum to ruthenium was 1:1.5 mole ratio) particles were supported on carbon particles, and the polymer electrolyte solution had hydrogen ion conductivity. The anode catalyst layer 2 was formed by applying the anode catalyst layer forming ink by the spraying method on a main surface of the polymer electrolyte membrane 1 which surface was opposite the main surface on which the cathode catalyst layer 3 was formed. Thus, the membrane-catalyst layer assembly 9 was obtained.

Next, two gas diffusion layers each including carbon paper subjected to water repellent finish and a water-repellent carbon layer disposed on one of surfaces of the carbon paper and containing fluorocarbon resin and carbon were prepared. These two gas diffusion layers sandwiched the membrane-catalyst layer assembly 9 such that center portions of the water-repellent carbon layers contacted the cathode catalyst layer 3 and the anode catalyst layer 2, respectively. These components were entirely subjected to thermocompression bonding (120° C., 10 minutes, and 10 kgf/cm$^2$) by a hot press. Thus, the membrane-electrode assembly 10 was obtained.

Finally, the cell 101 was manufactured using the membrane-electrode assembly 10 obtained as above. To be specific, the membrane-electrode assembly 10 formed as above was sandwiched between the anode separator 20 and the cathode separator 30. The gasket 40 made of fluorocarbon rubber was disposed between the polymer electrolyte membrane 1 and the separator 20 and around the anode 6 in plan view, and the gasket 50 made of fluorocarbon rubber was disposed between the polymer electrolyte membrane 1 and the separator 30 and around the cathode 7 in plan view. Further, the current collector and the insulating plate were disposed on an outer side of each of both separators 20 and 30, and these components were fastened by fastening members. Thus, the cell 101 is formed. In this case, the anode separator 20 and the cathode separator 30 formed such that the macroscopic flow of the fuel gas and the macroscopic flow of the oxidizing gas formed the parallel flow were used, and the current collector on the cathode separator 30 were divided (described below) into 27 regions.

In the present experimental example, the cell 101 was operated for a long period of time under the following conditions, and the distribution of a cell voltage and the distribution of the amount of electric power generation were measured. The temperature of the cell 101 was controlled to 80° C. The hydrogen gas was supplied as the fuel gas to the anode gas channel 21, and a gas prepared by mixing the air and SO$_2$ of a ratio (concentration) of 1 ppm in the air was supplied to the cathode gas channel 31. In this case, a hydrogen gas utilization ratio was set to 70%, and an air utilization ratio was set to 50%. The hydrogen gas and the air were supplied to the cell 101 after each of the hydrogen gas and the air was humidified to have the dew point of about 65° C.

Then, the whole electric power generation was controlled to be 0.2 A/cm$^2$ using a current collector having a main surface divided into 27 regions along the cathode gas channel (an uppermost stream region of the cathode gas channel was a region P1, and a lowermost stream region of the cathode gas channel was a region P27) (FIG. 15 shows only 27 regions of the current collector) with respect to the cathode separator 30 as shown in FIG. 15, and the amount of electric power generation (current) was measured for each region (regions P1 to P27).

The current collector was constituted by 27 small pieces (nine pieces in a vertical direction times three pieces in a horizontal direction). Respective small pieces of the current collector were sequentially arranged along the cathode gas channel 31 such that a portion corresponding to the uppermost stream region was the region P1, and a portion corresponding to the lowermost stream portion was the region P27. The current collector was manufactured such that a peripheral surface of each of small pieces of the regions P1 to P27 was covered with an insulating fluorocarbon resin plate, and small pieces were adhered to one another in order of P1 to P27.

As a result, when the electric power generation was started, the amount of electric power generation was first gradually decreased in the regions P1 to P9. It is thought that this is because the regions P1 to P9 were the portion corresponding to the upstream portion of the cathode gas channel 31, and since the concentration of SO$_2$ supplied to the cathode 7 as the impurity was high, the cathode catalyst layer 3 in the regions P1 to P9 was poisoned. Next, when the electric power generation by the cell 101 was further continued, the amount of electric power generation was steeply decreased in the regions P10 to P21. After that, when the electric power generation was further continued, the amount of electric power generation was steeply decreased in the regions P1 to P9. Finally, the supply of SO$_2$ to the cathode 7 was stopped, and the electric power generation by the cell 101 was carried out. However, the amount of electric power generation by the cell 101 did not recover.

After that, a cyclic voltammetry was carried out to check the reason of the steep decrease in the amount of electric power generation in the regions P10 to P21 and the reason of the subsequent steep decrease in the amount of electric power generation in the regions P1 to P9. Specifically, the hydrogen gas having the dew point of 65° C. was supplied to the cathode 7 of the cell 101, the nitrogen gas having the dew point of 65° C. was supplied to the anode 6 of the cell 101, and the temperature of the cell 101 was maintained at 65° C. Then, in a bipolar cyclic voltammetry using the cathode 7 as a reference electrode and the anode 6 as a working electrode, a potential was swept in a range from a natural potential to +0.6 V in the same manner as the cathode 7 (hereinafter, this measurement method is referred to as "anode CV measuring method"). With this, CV characteristics (electrochemical characteristics) of the anode 6 were measured. FIG. 16 is a graph in which current values of the anode by an oxidation-reduction reaction before and after an endurance test are plotted. In FIG. 16, a broken line denotes a plot of the current values before the endurance test (before the electric power generation), and a solid line denotes a plot of the current values after the endurance test (after the electric power generation).

As shown in FIG. 16, it was found that a peak near 0.2 V (position indicated by an arrow A) steeply decreased before and after the endurance test. It is thought that this is because the peak (peak due to adsorption and desorption of hydrogen) due to platinum ruthenium of the anode 6 changed. Therefore, it was found that in a case where the cell 101 was operated under the low humidification condition, serious poisoning of the anode 6 occurred. It is thought that this is because in a case where the cell 101 was operated under the low humidification condition, the water generated by the cell reaction on the cathode 7 side moved from the cathode 7 side to the anode 6 side by the back diffusion phenomenon (back diffusion water), and the sulfur compound having moved by the back diffusion water poisoned the anode 6.

Experimental Example 2

In Experimental Example 2, the cell voltage was measured while generating the electric power using the cell 100 of FIG. 13 (Embodiment 3) and the cell 101 of FIG. 14 (Comparative Example) for a long period of time (about 280 hours in the case of the cell 100 of Embodiment 3 and about 260 hours in the case of the cell 101 of Comparative Example).

The cell 100 of Embodiment 3 shown in FIG. 13 was manufactured as below.

First, titanium oxide (produced by Ishihara Sangyo Kaisha, Ltd: Product Name "MPT-881") was dispersed in ethanol, a diammine dinitro platinum nitric acid solution (produced by Tanaka Kikinzoku Kogyo) that was a precursor of platinum was added such that the supporting rate of platinum became 10 wt %, and this was dried at 80° C. while being stirred adequately. Powder obtained as above was burned in a reduction atmosphere (10% hydrogen-90% nitrogen) at 250° C. for five hours. Thus, a platinum supporting titanium oxide catalyst (first sulfur compound adsorption catalyst) was obtained. A polymer electrolyte solution (produced by Asahi Glass Co., Ltd.: Product Name "Flemion" (trademark)) having proton conductivity was added to the platinum supporting titanium oxide catalyst such that the mass ratio of the catalyst to the polymer electrolyte solution became 1:1, and ethanol was further added to obtain an appropriate viscosity, thereby obtaining a paste for forming the second anode catalyst layer 2B. The paste prepared by the above method was spread on a film to be dried in the atmosphere overnight, thereby obtaining a thin film. Then, the thin film was heat-transferred onto the polymer electrolyte membrane 1. Thus, the second anode catalyst layer 2B was formed. Other than the manufacture of the second anode catalyst layer 2B, the cell of Embodiment 3 was manufactured in the same manner as the cell 101 of Comparative Example of Experimental Example 1.

Then, the temperature of each of the cells 100 and 101 was controlled to 80° C. The hydrogen gas was supplied as the fuel gas to the anode gas channel 21, and a gas prepared by mixing the air and $SO_2$ of a ratio (concentration) of 3 ppm in the air was supplied to the cathode gas channel 31. In this case, the hydrogen gas and the air were supplied to each of the cells 100 and 101 after each of the hydrogen gas and the air was humidified to have the dew point of about 65° C. Then, the electric power generation was controlled to obtain a current density of 0.2 A/cm$^2$, each of the cells 100 and 101 was operated, and the cell voltage was measured in the process.

FIG. 17 is a graph in which time-lapse changes of the cell voltage of the cell of Embodiment 3 and time-lapse changes of the cell voltage of the cell of Comparative Example are compared to each other.

As shown in FIG. 17, in the case of the cell 101 of Comparative Example, the voltage decreased for about 80 hours from the start of the electric power generation. Then, the voltage was maintained constant. After that, the voltage steeply decreased from after about 130 hours.

In the case of the cell 100 of Embodiment 3, the voltage decreased for about 70 hours from the start of the electric power generation. Then, the voltage was maintained constant. After that, the voltage decreased from after 200 hours.

In the cell 100 of Embodiment 3 as compared to the cell 101 of Comparative Example, a time until the start of the second cell voltage reduction was significantly increased. With this, it was found that as in Embodiment 3, in a case where the cell or the fuel cell was operated under the low humidification condition, disposing the second anode catalyst layer 2B between the first anode catalyst layer 2A and the polymer electrolyte membrane 1 was effective for the poisoning of the first anode catalyst layer 2A. It is thought that this is because the catalyst (in the experimental example, titanium oxide as the catalyst carrier and platinum as the catalyst metal) contained in the second anode catalyst layer 2B adsorbs a poisoning constituent (sulfur compound) moving from the cathode 7 side to the anode 6 side by the back diffusion water to prevent the poisoning constituent (sulfur compound) from reaching the first anode catalyst layer 2A. Moreover, the amount (mass) of platinum contained in the first anode catalyst layer 2A and the second anode catalyst layer 2B in the cell 100 of Embodiment 3 was about 120% of the amount (mass) of platinum contained in the anode catalyst layer 2 in the cell 101 of Comparative Example. Moreover, the time until the start of the steep cell voltage reduction in the cell 100 of Embodiment 3 was about 160% of that in the cell 101 of Comparative Example. Thus, the effect of suppression of the cell voltage reduction was higher than the effect of the increase in the amount of platinum. It is thought that this is because titanium oxide used as the catalyst carrier also served as the catalyst which removes (adsorbs) the poisoning constituent (sulfur compound).

In the present experimental example, platinum was used as the first sulfur compound adsorption catalyst. However, the same effects may be obtained even by using a material, such as ruthenium, having a sulfur compound adsorption ability.

As above, it was found that by disposing the second anode catalyst layer 2B containing the catalyst which adsorbs the sulfur compound, between the polymer electrolyte membrane 1 and the first anode catalyst layer 2A, the poisoning of the anode 6 by the sulfur compound moving from the cathode 7 side to the anode 6 side by the back diffusion water in a case where the cell was operated under the low humidification condition (and the voltage reduction by the poisoning of the anode 6) is suppressed, and the performances of the cell and the fuel cell can be improved. Further, also in consideration of the result of Experimental Example 1, the present inventors have concluded that the poisoning of the anode 6 is effectively suppressed by selectively disposing the second anode catalyst layer 2B between the first anode catalyst layer 2A corresponding to the midstream portion of the cathode gas channel 31 and the polymer electrolyte membrane 1. To be specific, the present inventors have found that the poisoning of the anode 6 by the sulfur compound is effectively suppressed by disposing the second anode catalyst layer 2B containing the catalyst which adsorbs the sulfur compound, on a portion where the amount of back diffusion water generated is large, and the amount of the sulfur compound moving by the back diffusion water is large.

INDUSTRIAL APPLICABILITY

The fuel cell, the membrane-electrode assembly, and the membrane-catalyst layer assembly according to the present invention are useful as a fuel cell, a membrane-electrode assembly, and a membrane-catalyst layer assembly in each of which the poisoning of an anode by a sulfur compound is suppressed in a case where the fuel cell is operated under a low humidification condition.

BRIEF DESCRIPTION OF THE DRAWINGS

FIG. 2(a) is a plan view showing a main surface on which an anode gas channel is formed. FIG. 2(b) is a plan view showing a main surface on which a heat medium channel is formed.

FIG. 3(a) is a plan view showing a main surface on which a cathode gas channel is formed. FIG. 3(b) is a plan view showing a main surface on which the heat medium channel is formed.

Figure 1:
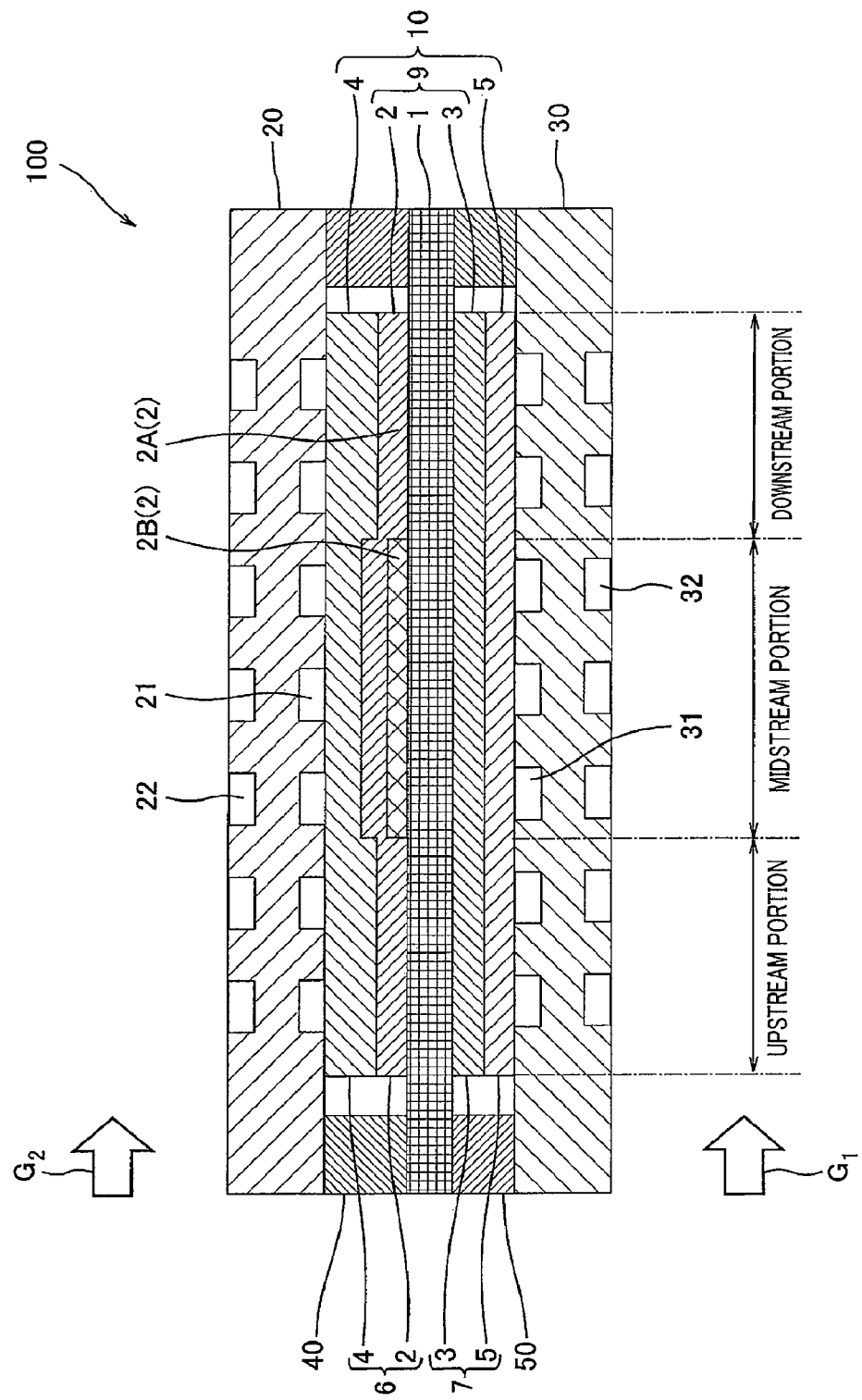
FIG. 1 is a cross-sectional view schematically showing a schematic configuration of a cell constituting a fuel cell of Embodiment 1 of the present invention.
Figure 2:
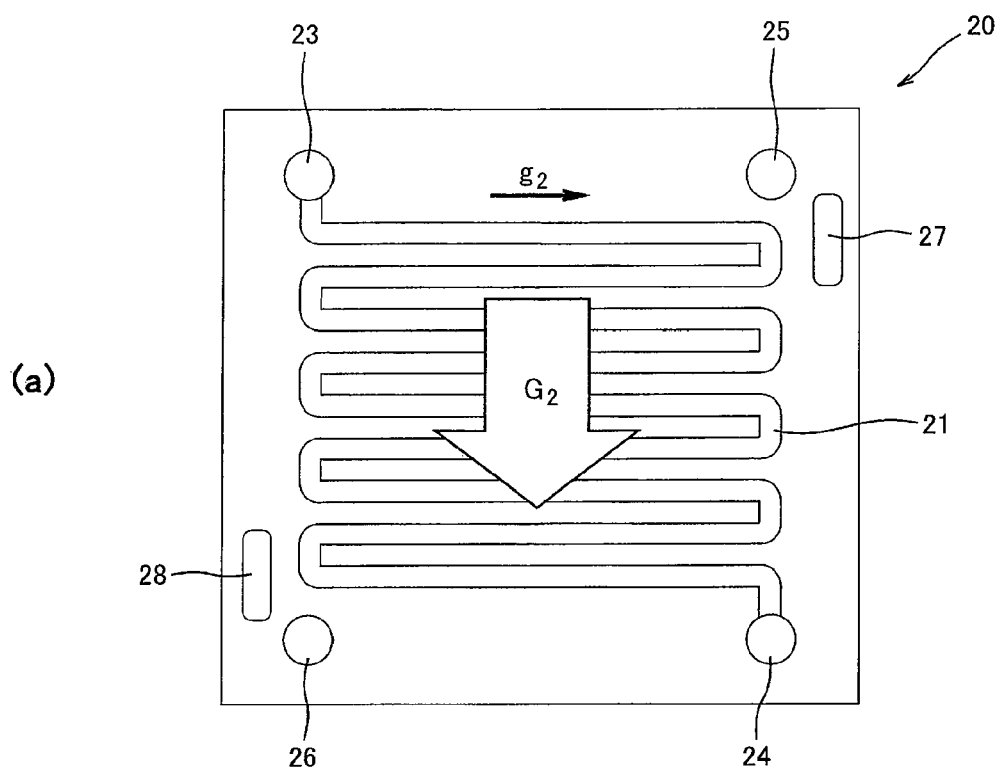
FIG. 2 are plan views showing a schematic configuration of an anode separator constituting the cell of FIG. 1.
Figure 2:
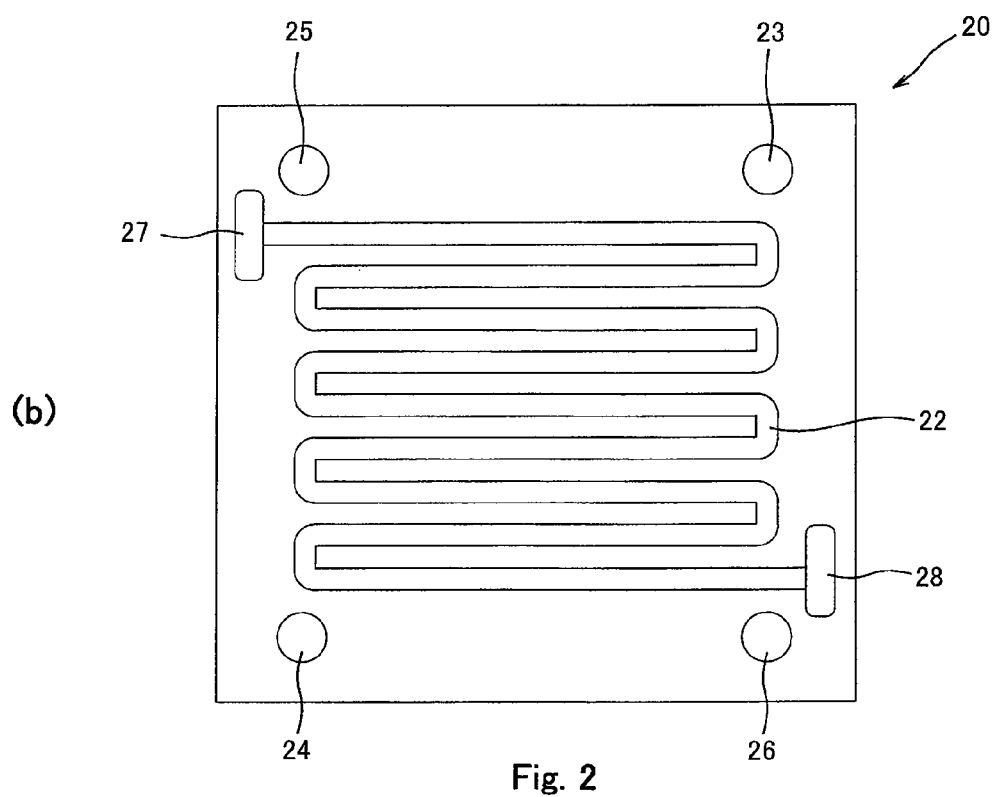
Figure 3:
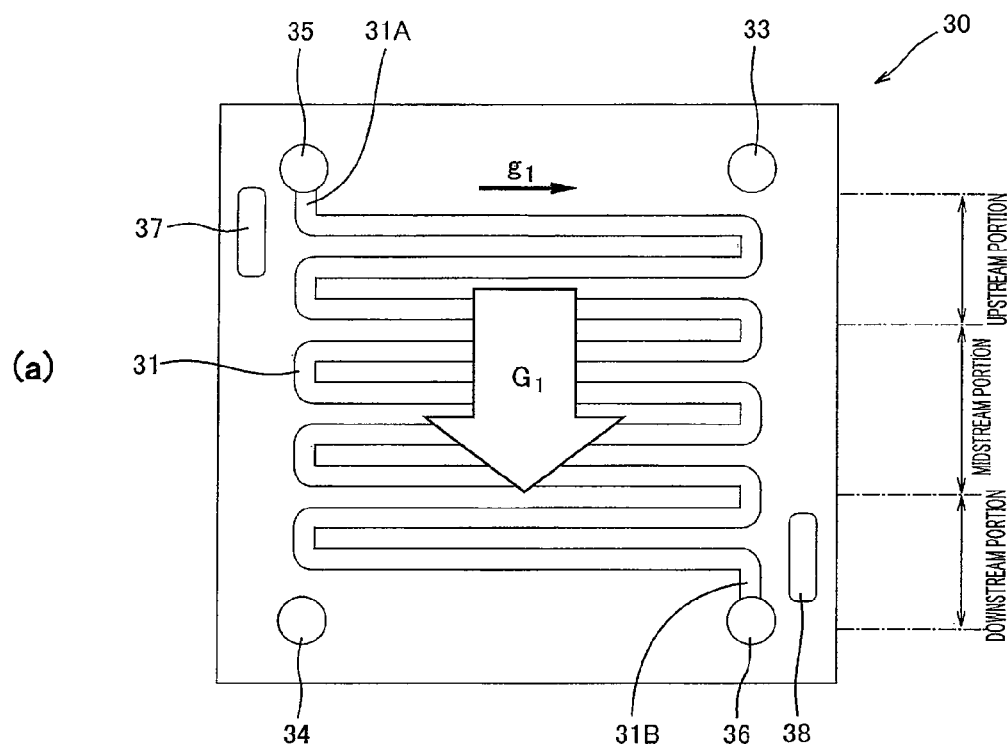
FIG. 3 are plan views showing a schematic configuration of a cathode separator constituting the cell of FIG. 1.
Figure 3:
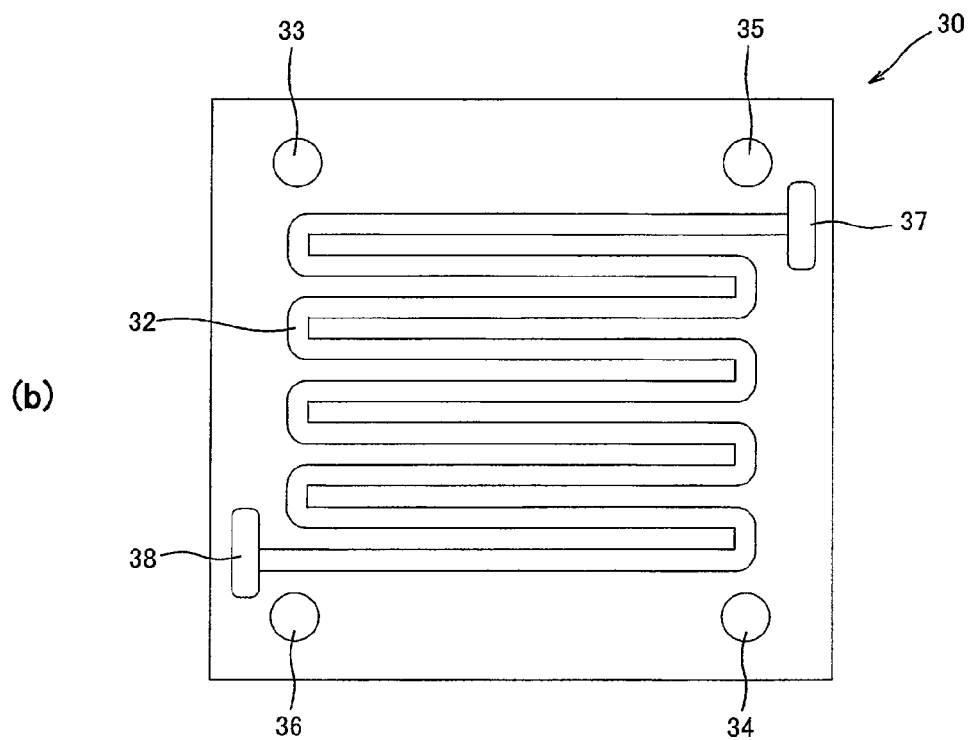
Figure 4:
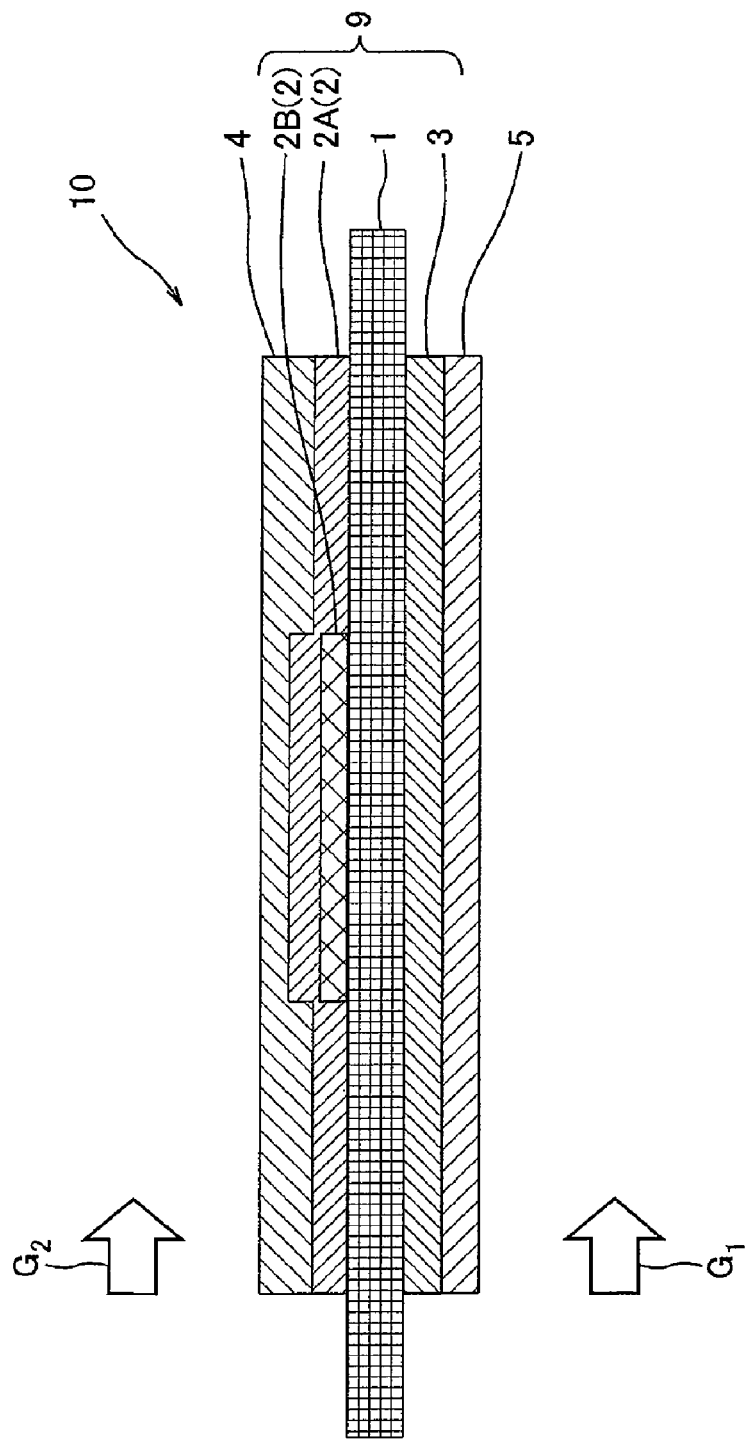
FIG. 4 is a cross-sectional view showing a schematic configuration of a membrane-electrode assembly constituting the cell of FIG. 1.
Figure 5:
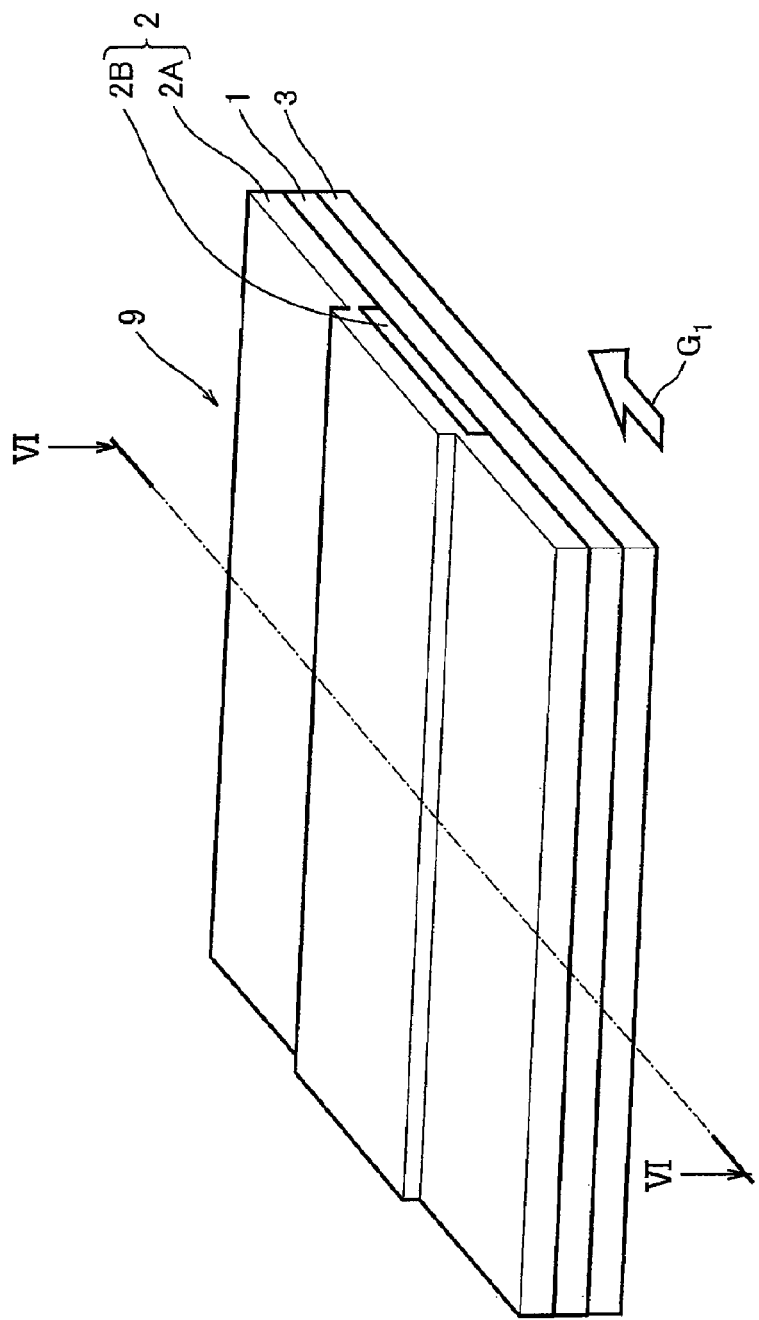
FIG. 5 is a perspective view showing a schematic configuration of a membrane-catalyst layer assembly constituting the cell of FIG. 1.
Figure 6:
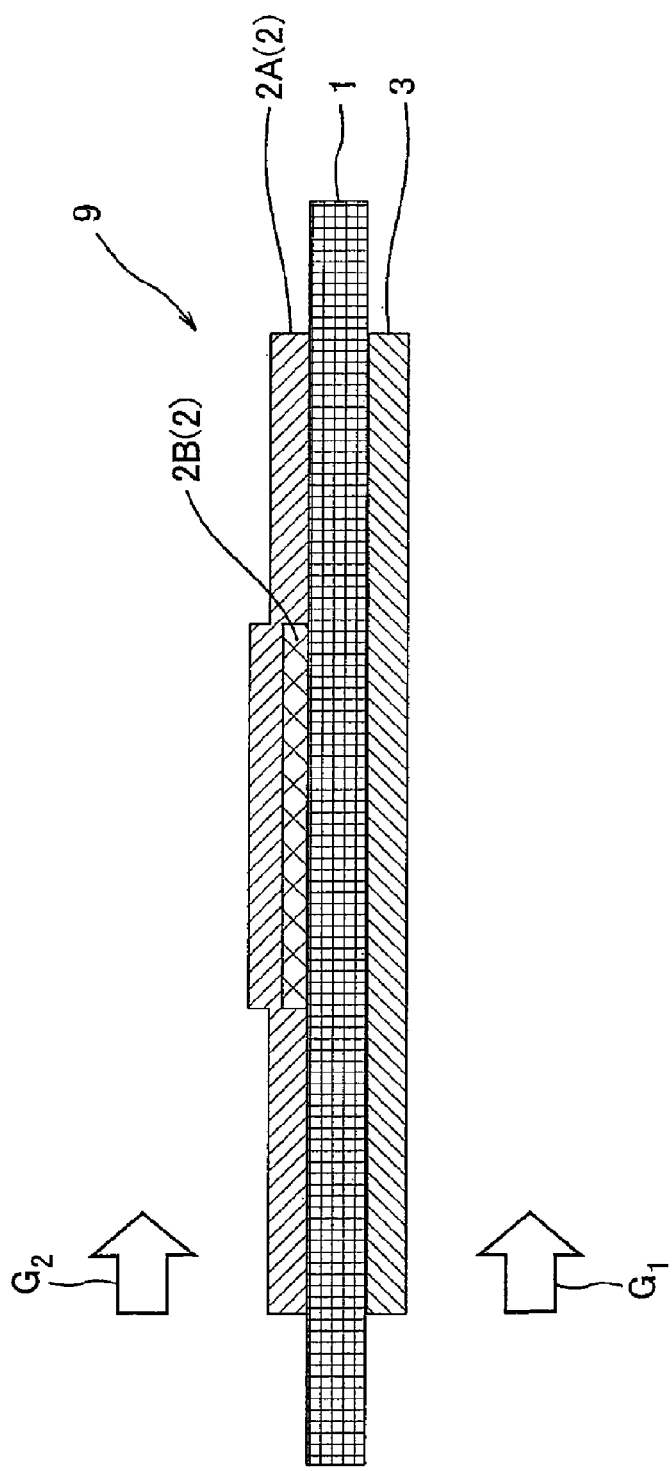
FIG. 6 is a cross-sectional view taken along line VI-VI of FIG. 5 and showing the membrane-catalyst layer assembly of FIG. 5.
Figure 7:
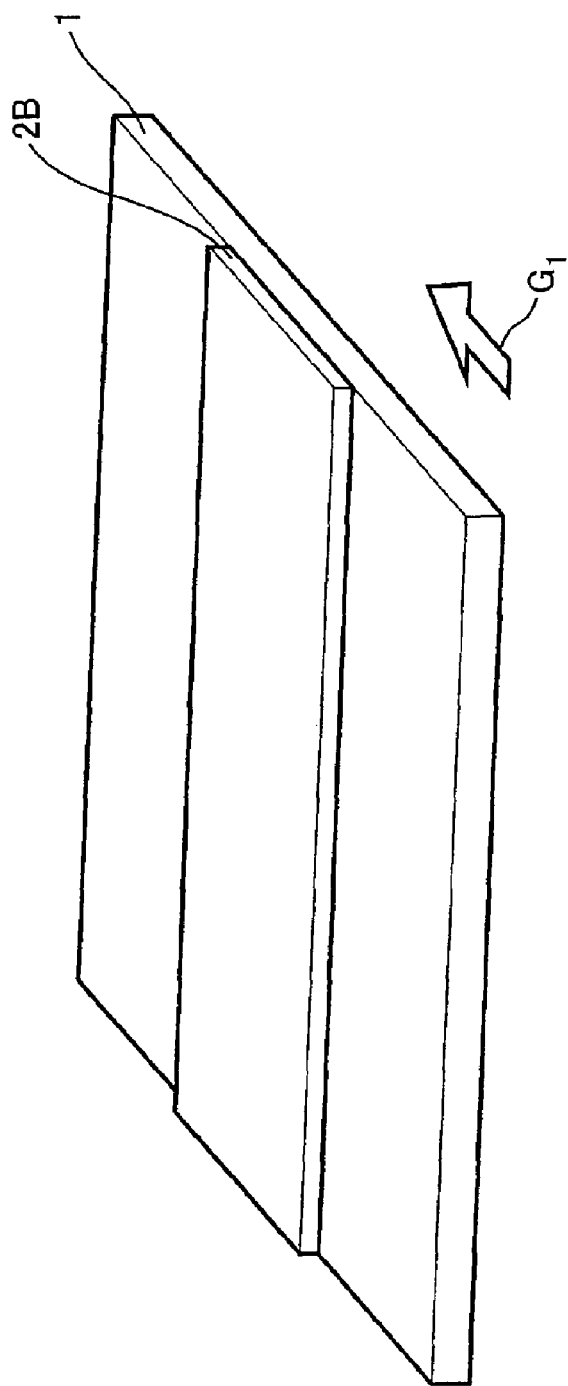
FIG. 7 is a perspective view showing a state where a second anode catalyst layer is stacked on a polymer electrolyte membrane.
Figure 8:
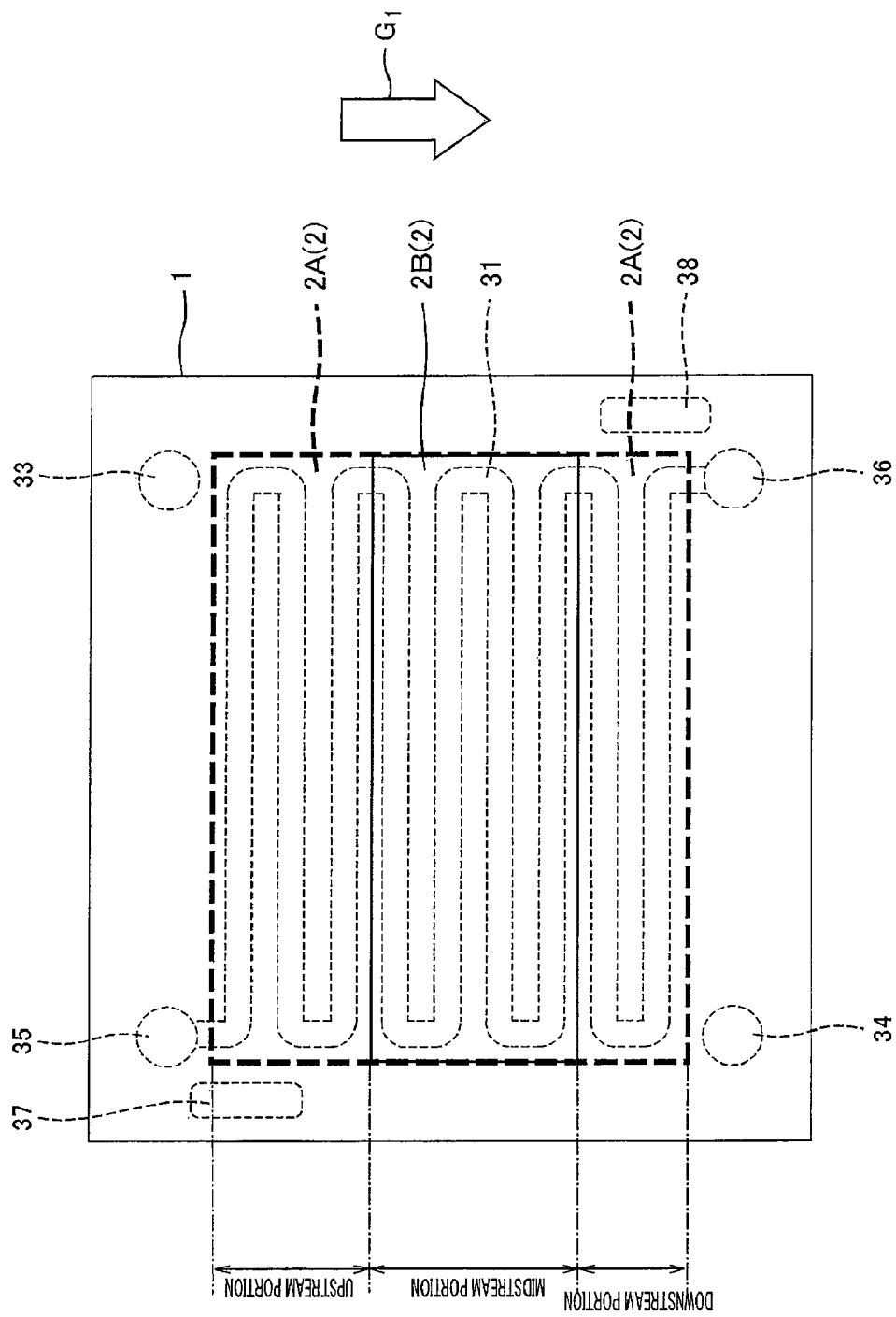
FIG. 8 is a plan view showing the state where the second anode catalyst layer is stacked on the polymer electrolyte membrane in FIG. 7, when viewed from a first anode catalyst layer side.
Figure 9:
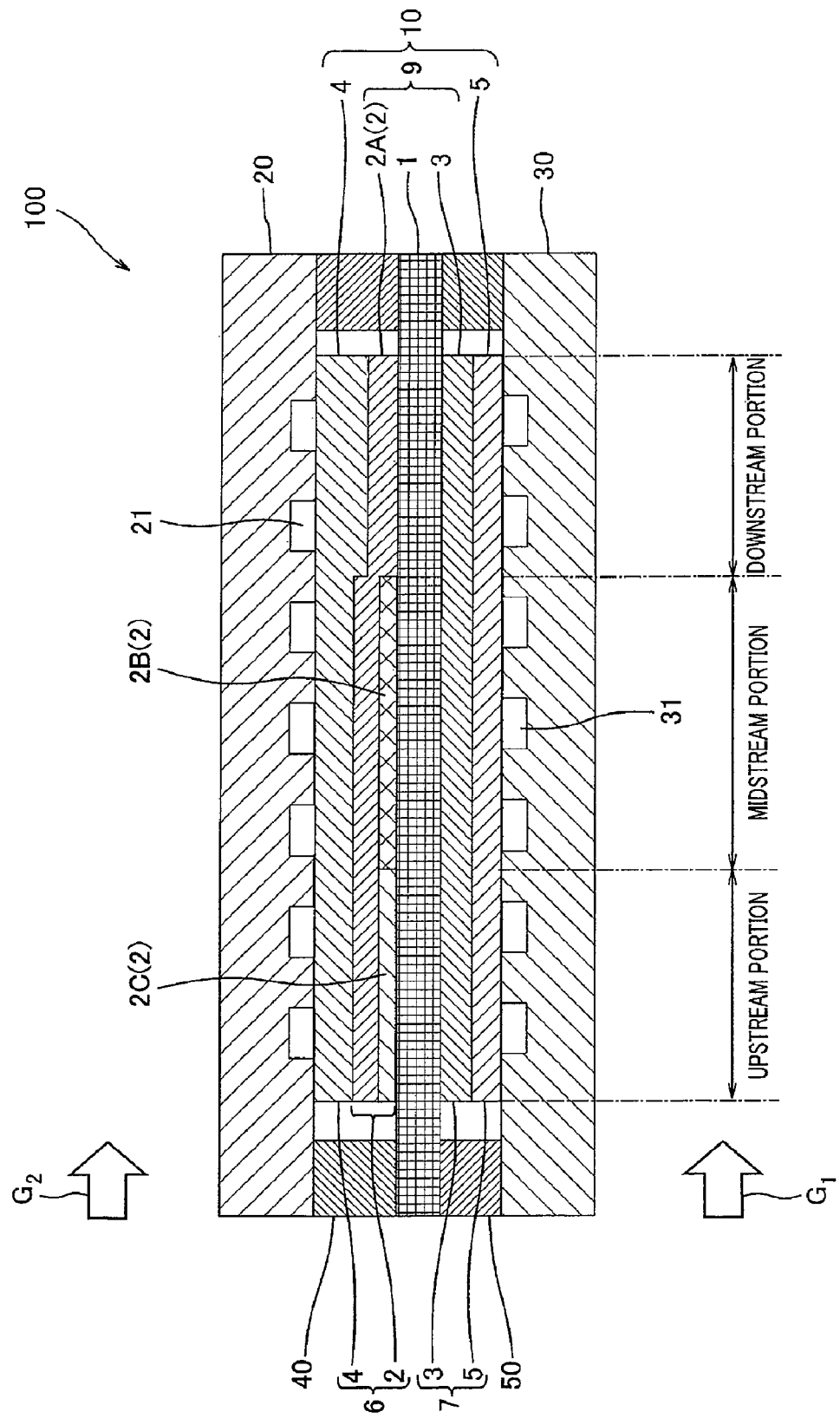
FIG. 9 is a cross-sectional view schematically showing a schematic configuration of the cell constituting the fuel cell of Embodiment 2 of the present invention.
Figure 10:
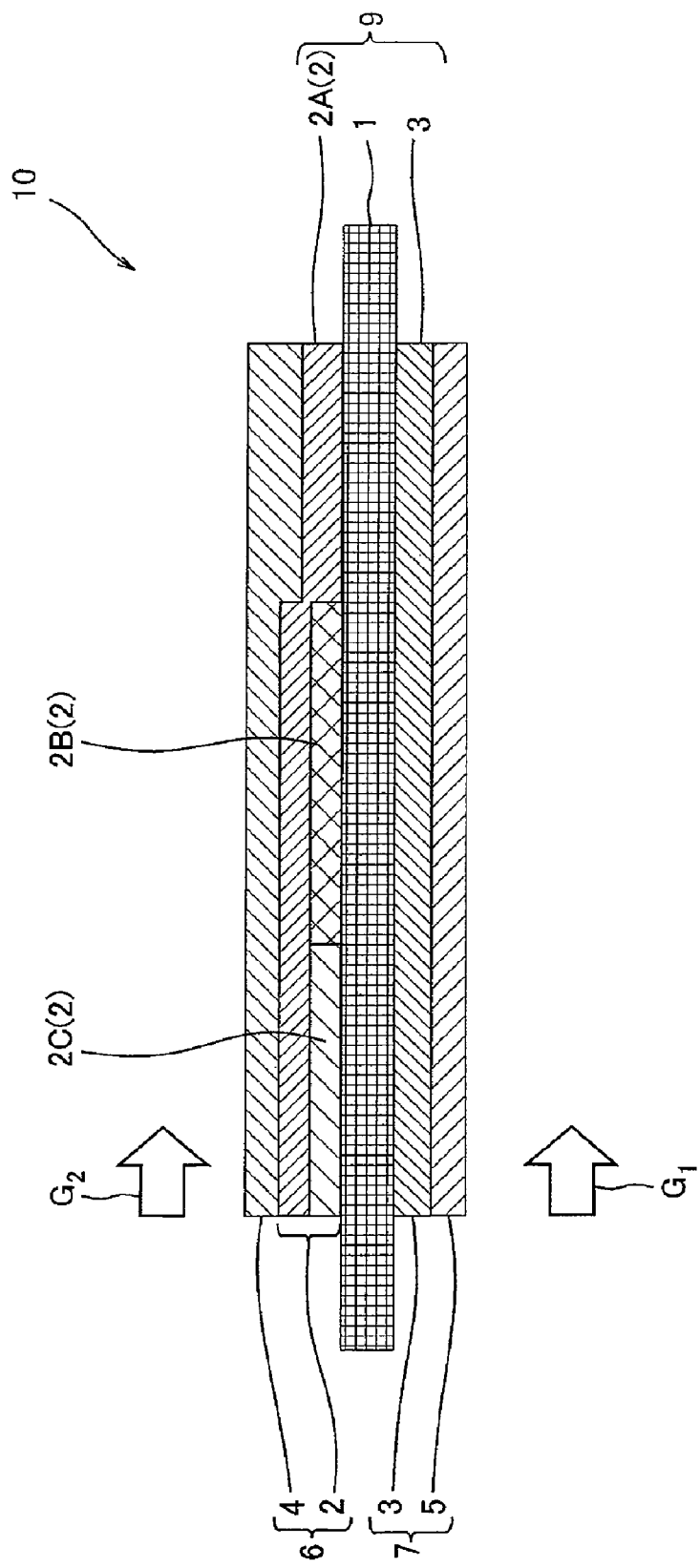
FIG. 10 is a cross-sectional view showing a schematic configuration of the membrane-electrode assembly constituting the cell of FIG. 9.
Figure 11:
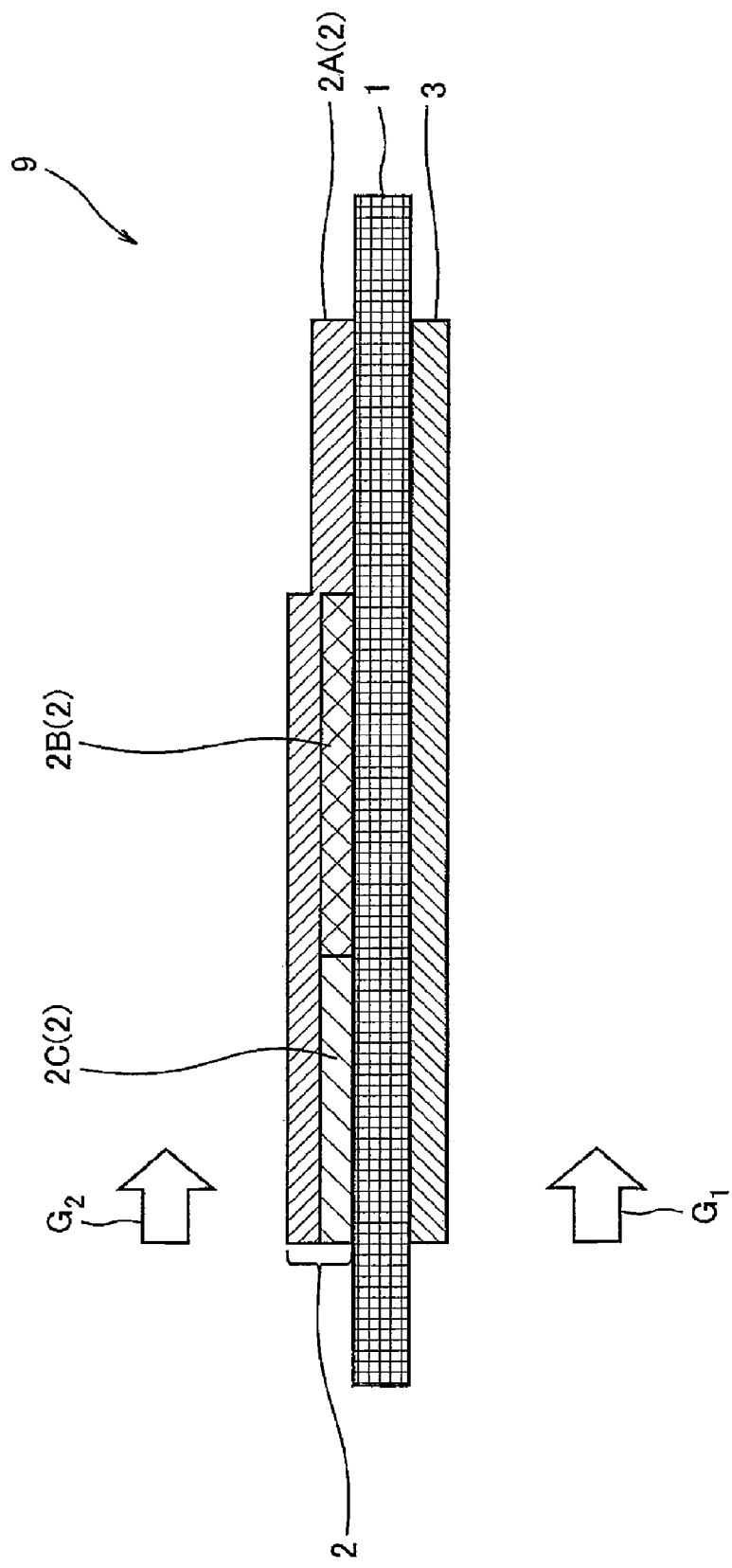
FIG. 11 is a cross-sectional view showing a schematic configuration of the membrane-catalyst layer assembly of the cell of FIG. 9.
Figure 12:
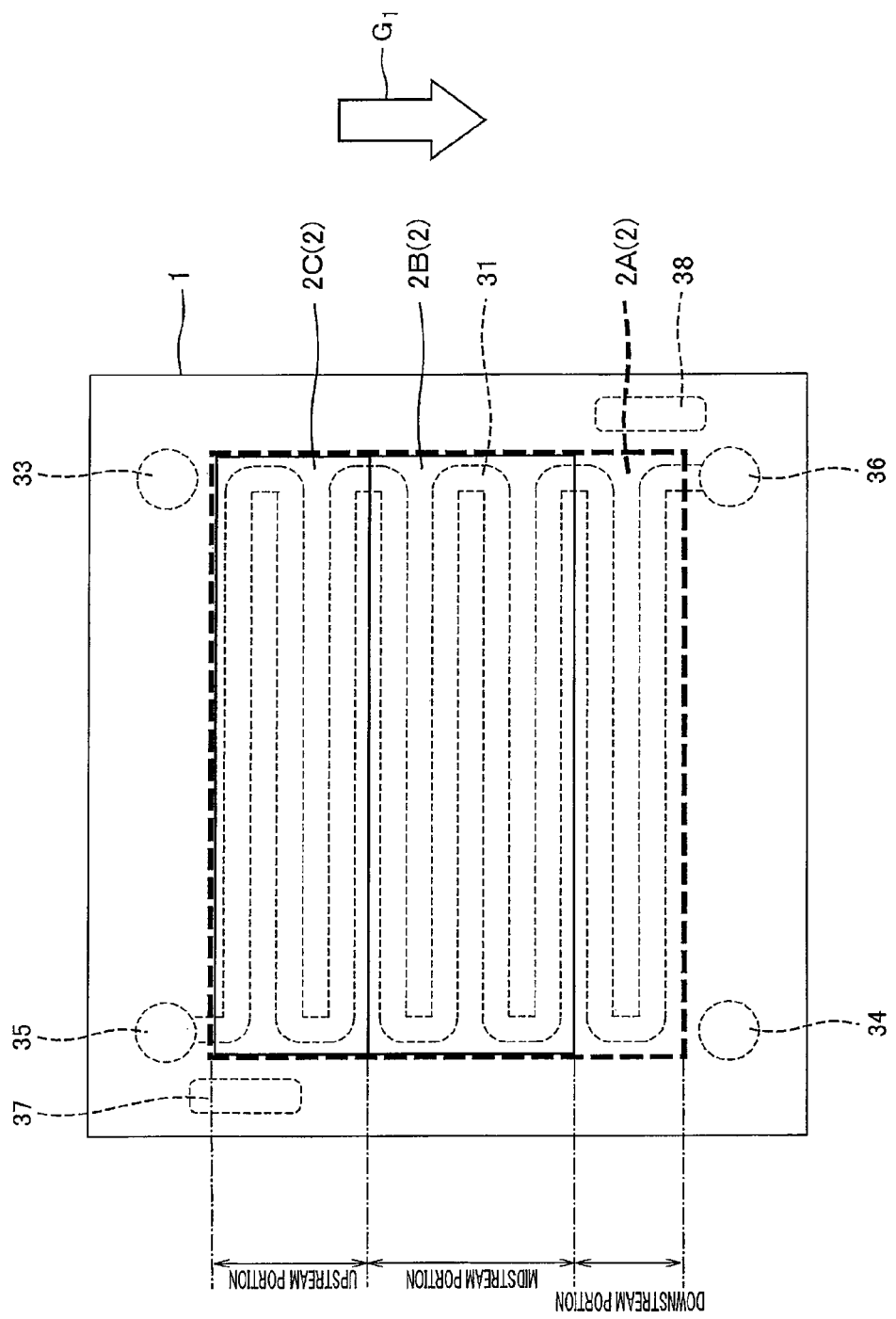
FIG. 12 is a plan view showing the membrane-catalyst layer assembly of FIG. 11 when viewed from the first anode catalyst layer side.
Figure 13:
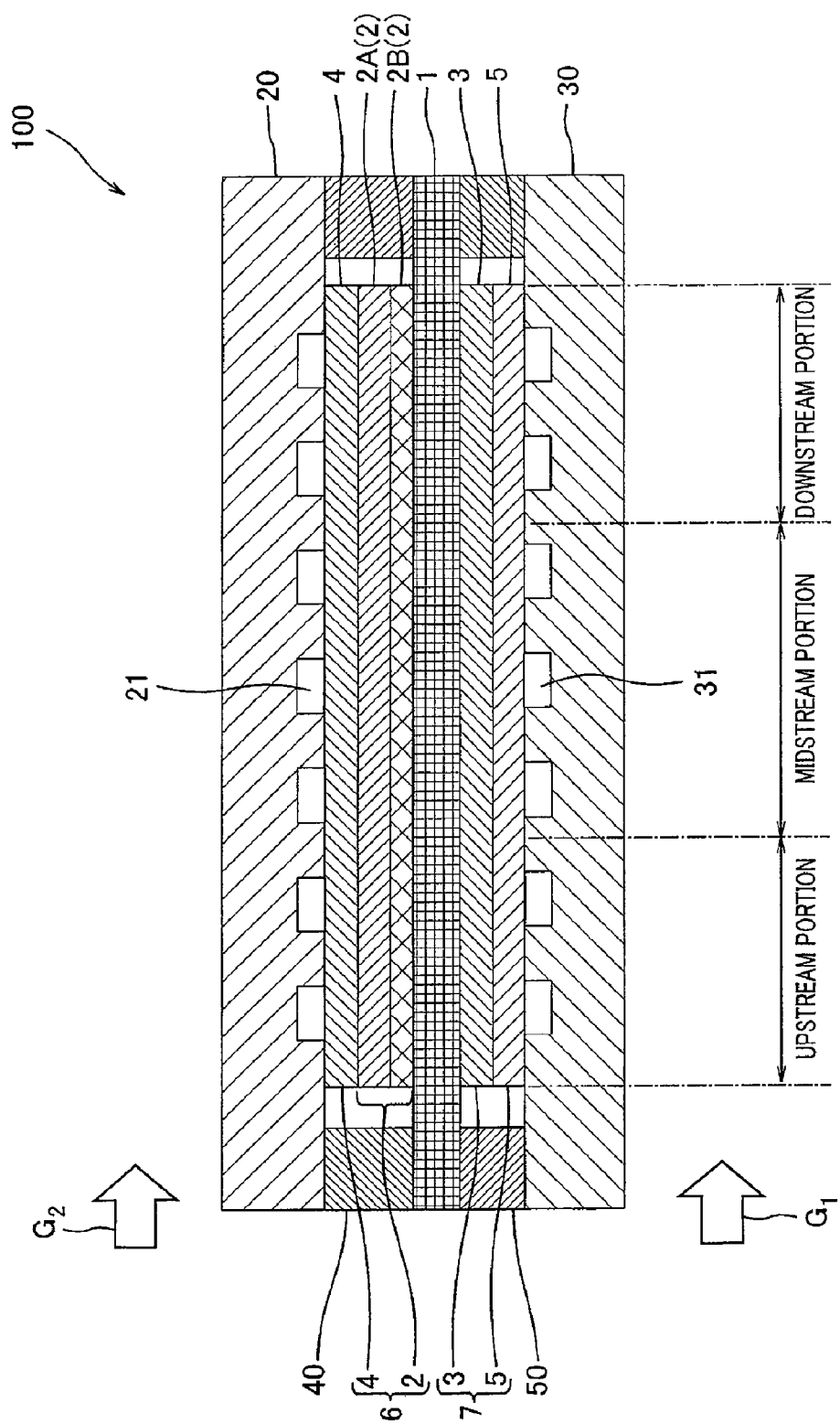
FIG. 13 is a cross-sectional view schematically showing a schematic configuration of the cell constituting the fuel cell of Embodiment 3 of the present invention.
Figure 14:
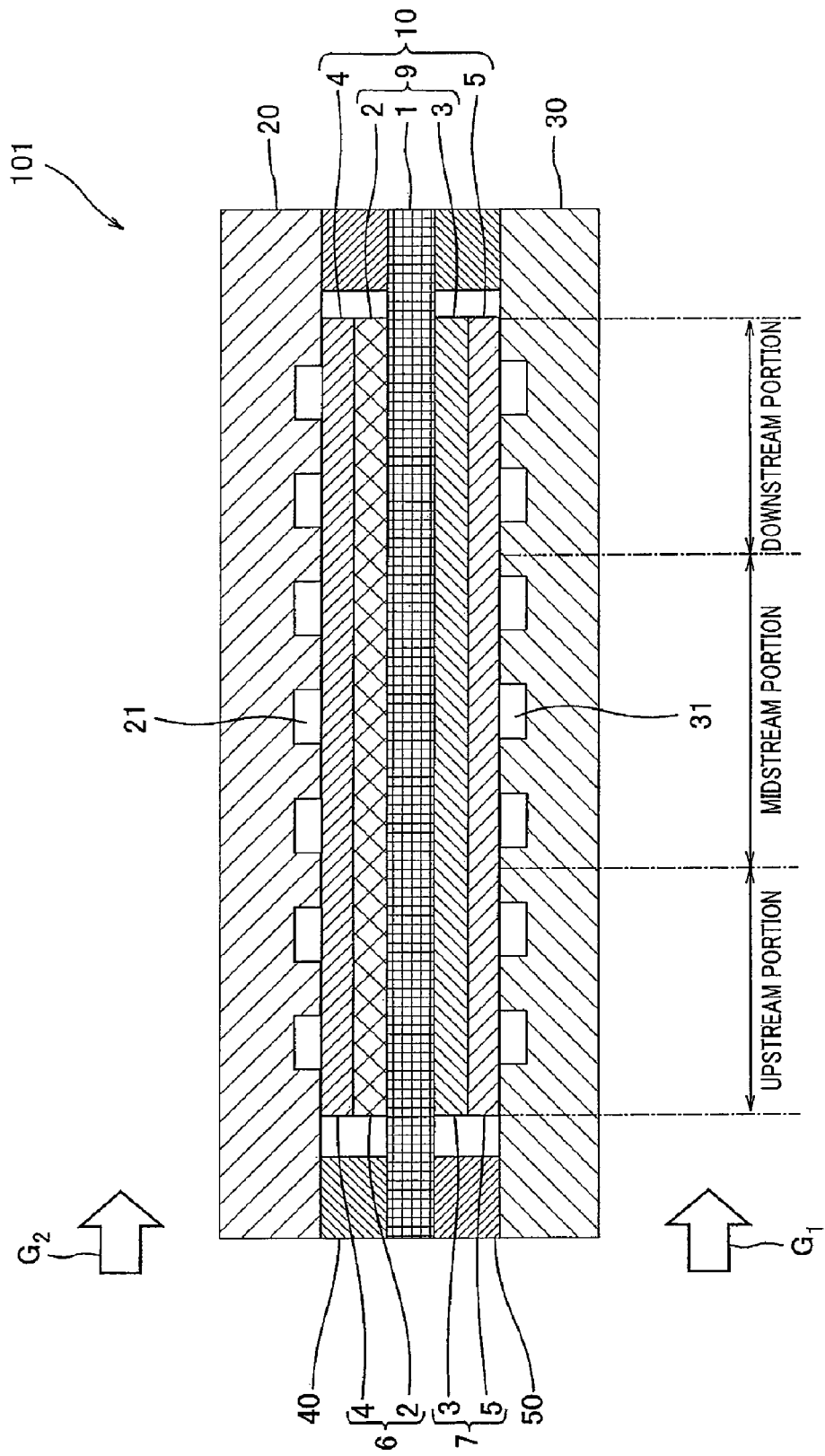
FIG. 14 is a cross-sectional view schematically showing a schematic configuration of the cell constituting the fuel cell of Comparative Example.
Figure 15:
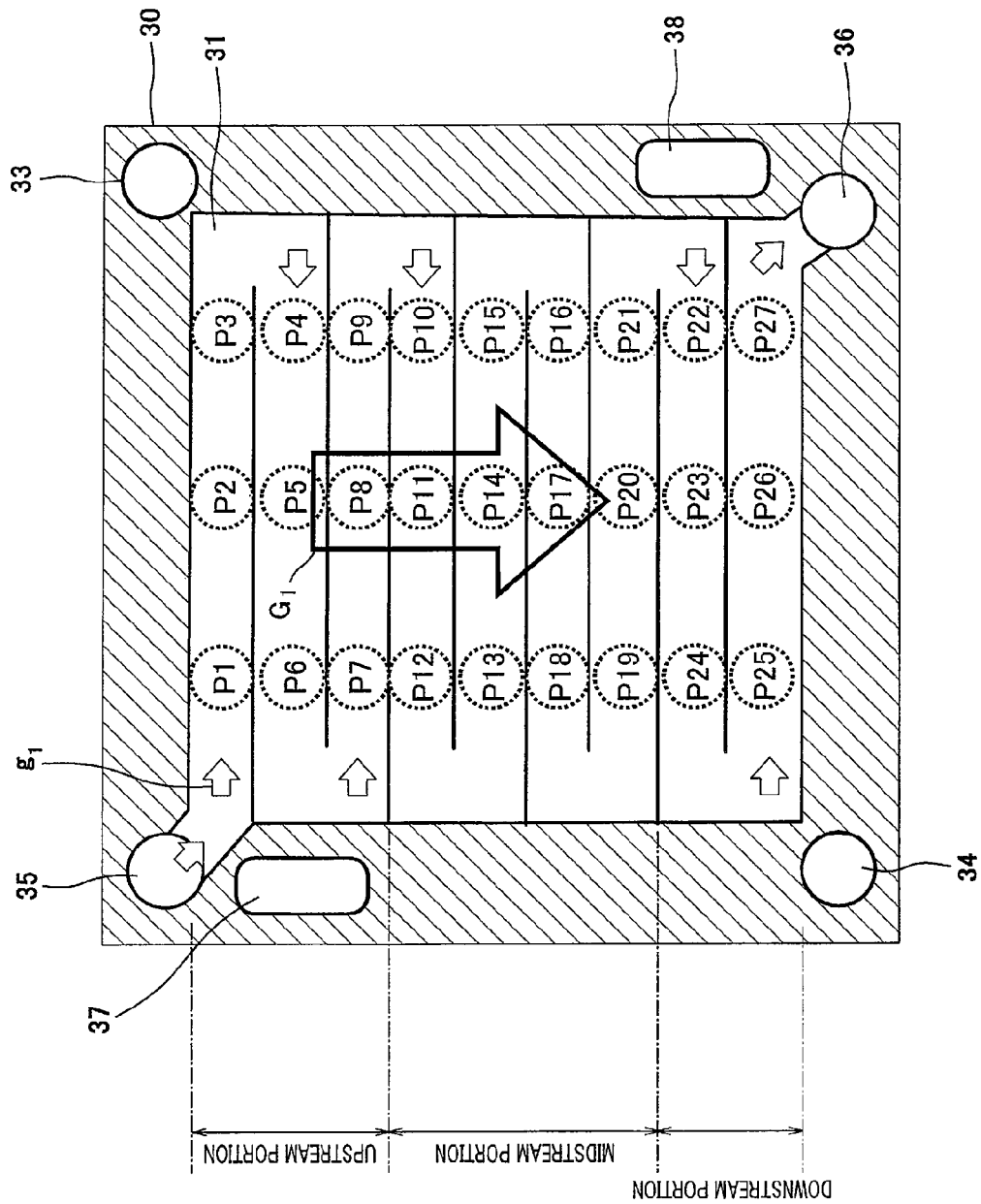
FIG. 15 is a plan view schematically showing respective regions for measuring an amount of electric power generation from an upstream portion to downstream portion of a cathode gas channel in Experimental Example 1.
Figure 16:
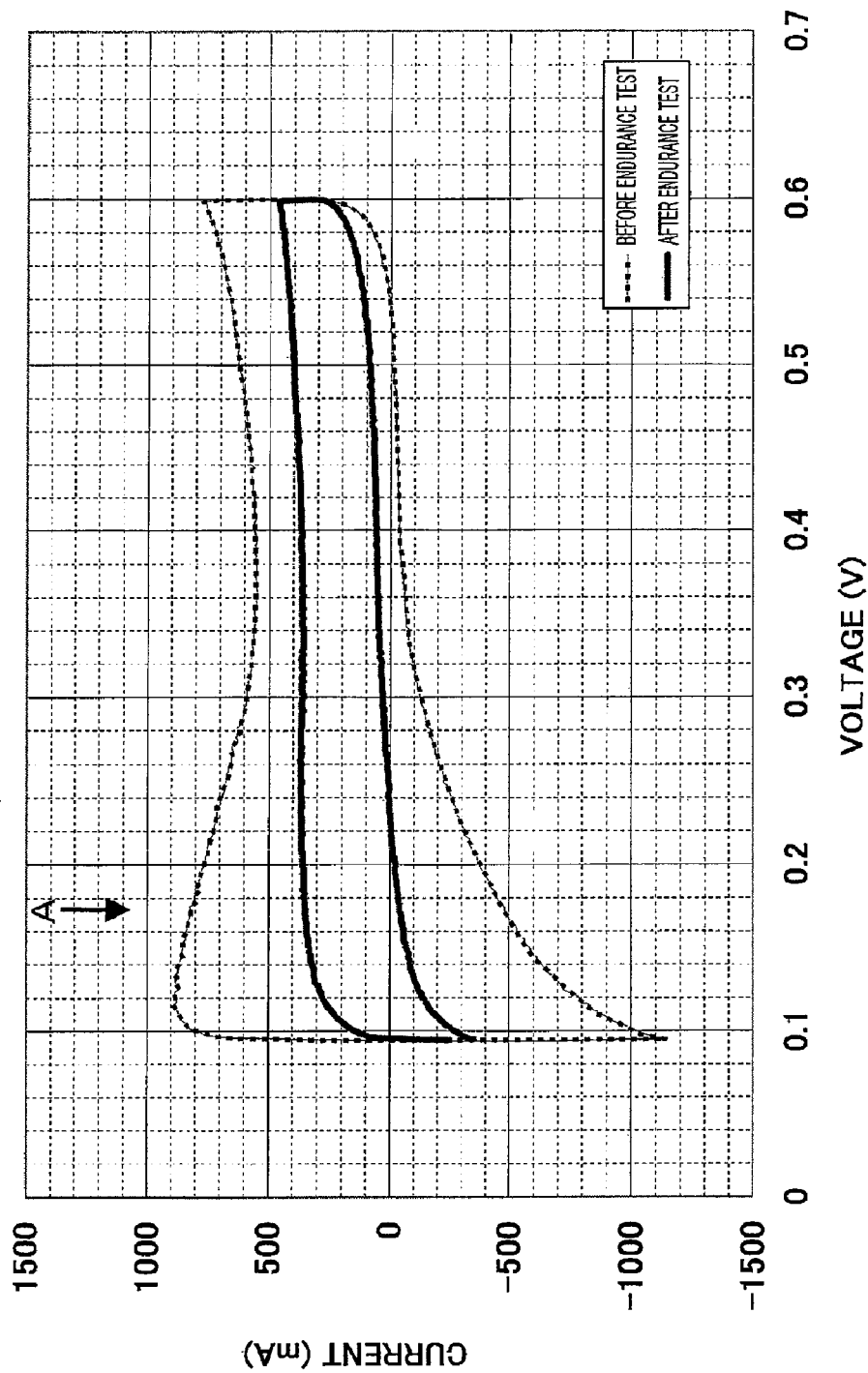
FIG. 16 is a graph in which current values of the anode by an oxidation-reduction reaction before and after an endurance test are plotted.
Figure 17:
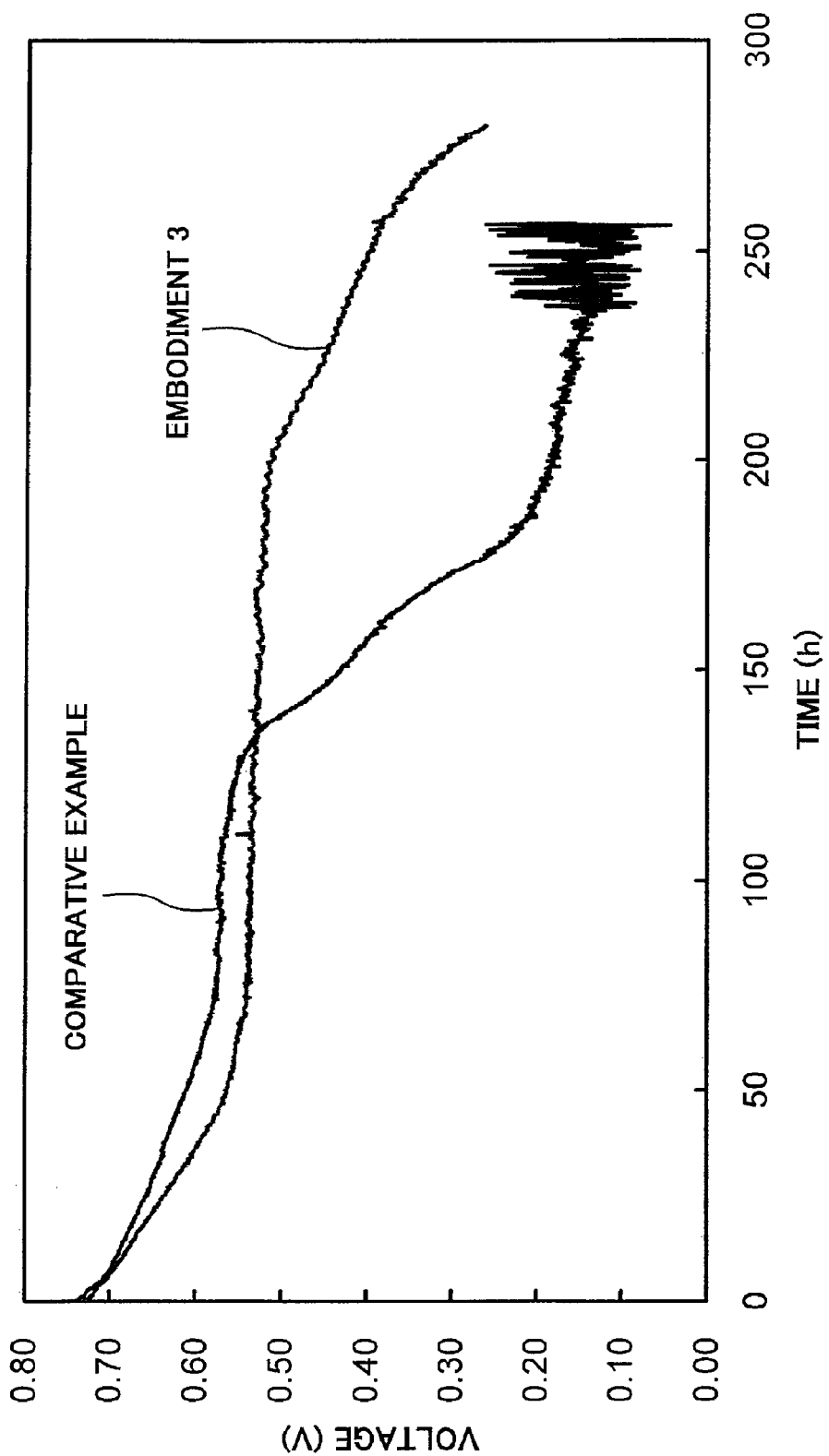
FIG. 17 is a graph in which time-lapse changes of a cell voltage of the cell of Embodiment 3 and time-lapse changes of the cell voltage of the cell of Comparative Example are compared to each other.

EXPLANATION OF REFERENCE NUMBERS 1 polymer electrolyte membrane
2 anode catalyst layer
2A first anode catalyst layer
2B second anode catalyst layer
2C third anode catalyst layer
3 cathode catalyst layer
4 anode gas diffusion layer
5 cathode gas diffusion layer
6 anode
7 cathode
9 membrane-catalyst layer assembly
10 membrane-electrode assembly
20 anode separator
21 anode gas channel
22, 32 heat medium channel
23, 33 anode gas supplying manifold hole
24, 34 anode gas discharging manifold hole
25, 35 cathode gas supplying manifold hole
26, 36 cathode gas discharging manifold hole
27, 37 heat medium supplying manifold hole
28, 38 heat medium discharging manifold hole
30 cathode separator
31 cathode gas channel
31A upstream end of cathode gas channel
31B downstream end of cathode gas channel
40, 50 gasket
100, 101 cell (single fuel cell)
A position of generation of peak in cyclic voltammogram
$g_1$ microscopic flow of oxidizing gas flowing through cathode gas channel
$g_2$ microscopic flow of fuel gas flowing through anode gas channel
$G_1$ macroscopic flow of oxidizing gas flowing through cathode gas channel
$G_2$ macroscopic flow of fuel gas flowing through anode gas channel

The invention claimed is:

1. A fuel cell comprising:
a membrane-electrode assembly including
a polymer electrolyte membrane,
a first anode catalyst layer and an anode gas diffusion layer sequentially stacked on one of main surfaces of the polymer electrolyte membrane,
a second anode catalyst layer disposed between the polymer electrolyte membrane and the first anode catalyst layer, and
a cathode catalyst layer and a cathode gas diffusion layer sequentially stacked on the other main surface of the polymer electrolyte membrane;
a plate-shaped anode separator having one main surface on which an anode gas channel is formed, and disposed such that the main surface on which the anode gas channel is formed contacts the anode gas diffusion layer; and
a plate-shaped cathode separator having one main surface on which a cathode gas channel is formed, and disposed such that the main surface on which the cathode gas channel is formed contacts the cathode gas diffusion layer, wherein:
the second anode catalyst layer contains a first sulfur compound adsorption catalyst which adsorbs a sulfur compound;
the first sulfur compound adsorption catalyst is formed by a metal which dissociates and adsorbs the sulfur compound and is supported by a catalyst carrier formed by a metal oxide; and
an operating temperature of the fuel cell is higher than each of a dew point of a fuel gas flowing through the anode gas channel and a dew point of an oxidizing gas flowing through the cathode gas channel.

2. The fuel cell according to claim 1, wherein the first sulfur compound adsorption catalyst contains elemental ruthenium.

3. The fuel cell according to claim 1, wherein the metal oxide constituting the catalyst carrier is at least one metal oxide selected from the group consisting of titanium oxide, silicon oxide, aluminum oxide, and zirconium oxide.

4. The fuel cell according to claim 3, wherein the metal oxide constituting the catalyst carrier is an insulator.

5. The fuel cell according to claim 1, wherein the second anode catalyst layer contains a polymer electrolyte.

6. The fuel cell according to claim 1, wherein in a case where a portion including an upstream end of the cathode gas channel is defined as an upstream portion, a portion including a downstream end of the cathode gas channel is defined as a downstream portion, and a portion other than the upstream portion and the downstream portion of the cathode gas channel is defined as a midstream portion, the second anode catalyst layer is disposed between the polymer electrolyte membrane and a portion of the first anode catalyst layer which portion is opposed to the midstream portion of the cathode gas channel.

7. The fuel cell according to claim 1, wherein the second anode catalyst layer further contains as a catalyst a metal containing as a constituent element at least one selected from the group consisting of aluminum, silicon, titanium, vanadium, chromium, manganese, iron, cobalt, nickel, copper, zinc, molybdenum, ruthenium, rhodium, palladium, silver, tin, tantalum, tungsten, rhenium, osmium, iridium, and gold.

8. The fuel cell according to claim 1, wherein a third anode catalyst layer is disposed between the polymer electrolyte membrane and a portion of the first anode catalyst layer which portion is opposed to an upstream portion of the cathode gas channel, and the third anode catalyst layer contains a second catalyst which adsorbs the sulfur compound.

* * * * *